United States Patent
Shiga et al.

(10) Patent No.: US 10,195,488 B2
(45) Date of Patent: Feb. 5, 2019

(54) GOLF BALL RESIN COMPOSITION AND GOLF BALL

(71) Applicant: Dunlop Sports Co. Ltd., Kobe-shi, Hyogo (JP)

(72) Inventors: Kazuyoshi Shiga, Kobe (JP); Hiroshi Tadaoka, Kobe (JP); Masanori Taguchi, Kobe (JP); Takahiro Shigemitsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/179,233

(22) Filed: Jun. 10, 2016

(65) Prior Publication Data

US 2016/0361604 A1    Dec. 15, 2016

(30) Foreign Application Priority Data

Jun. 12, 2015    (JP) .................................. 2015-118815

(51) Int. Cl.
| | | |
|---|---|---|
| *A63B 37/04* | (2006.01) | |
| *A63B 37/06* | (2006.01) | |
| *A63B 37/00* | (2006.01) | |
| *C08K 5/09* | (2006.01) | |
| *C08K 5/19* | (2006.01) | |

(Continued)

(52) U.S. Cl.
CPC ........ *A63B 37/0039* (2013.01); *A63B 37/004* (2013.01); *A63B 37/0041* (2013.01); *A63B 37/0043* (2013.01); *A63B 37/0045* (2013.01); *A63B 37/0048* (2013.01); *A63B 37/0049* (2013.01); *A63B 37/0075* (2013.01); *C08K 3/04* (2013.01); *C08K 3/22* (2013.01); *C08K 5/09* (2013.01); *C08K 5/098* (2013.01);

(Continued)

(58) Field of Classification Search
USPC .................................................. 473/351-378
See application file for complete search history.

(56) References Cited

U.S. PATENT DOCUMENTS

| | | | | |
|---|---|---|---|---|
| 8,349,958 B2* | 1/2013 | Shigemitsu | ........ | A63B 37/0023 473/378 |
| 8,426,523 B2* | 4/2013 | Okabe | ................ | A63B 37/0003 473/378 |

(Continued)

FOREIGN PATENT DOCUMENTS

| | | |
|---|---|---|
| JP | H10-328325 A | 12/1998 |
| JP | H10-328326 A | 12/1998 |

(Continued)

*Primary Examiner* — Alvin Hunter
(74) *Attorney, Agent, or Firm* — Birch, Stewart, Kolasch & Birch, LLP

(57) ABSTRACT

An object of the present invention is to provide a golf ball resin composition having a high resilience, flexibility and high fluidity. The present invention provides a golf ball resin composition having a bending stiffness ($M_{21-30}$) ranging from 600 kgf/cm² to 5,000 kgf/cm² within a bending angle from 21° to 30°, a rebound resilience (R) of 50% or more, a slab hardness (Shore D) ranging from 40 to 65, a melt flow rate (190° C., 2.16 kgf) of 1.0 g/10 min or more, and a resilience index value $((M_{21-30})^{0.5} \times (R/100)^3)$ of 8.5 or more.

21 Claims, 3 Drawing Sheets

(51) Int. Cl.
*C08K 3/22* (2006.01)
*C08K 3/04* (2006.01)
*C08K 5/098* (2006.01)
*C08K 5/20* (2006.01)

(52) U.S. Cl.
CPC .................. *C08K 5/19* (2013.01); *C08K 5/20* (2013.01); *C08K 2003/2224* (2013.01)

(56) References Cited

U.S. PATENT DOCUMENTS

| | | | |
|---|---|---|---|
| 8,674,025 B2* | 3/2014 | Shigemitsu | A63B 37/0003 473/373 |
| 8,944,936 B2* | 2/2015 | Shiga | C08K 5/098 473/374 |
| 8,986,135 B2* | 3/2015 | Shigemitsu | A63B 37/0003 473/373 |
| 9,080,031 B2* | 7/2015 | Shigemitsu | A63B 37/0003 |
| 9,119,991 B2* | 9/2015 | Kanemitsu | A63B 37/0059 |
| 9,162,111 B2* | 10/2015 | Shigemitsu | A63B 37/0003 |
| 9,174,090 B2* | 11/2015 | Shigemitsu | A63B 37/0023 |
| 9,174,091 B2* | 11/2015 | Shigemitsu | A63B 37/0031 |
| 9,192,818 B2* | 11/2015 | Shiga | C08K 5/521 |
| 9,205,305 B2* | 12/2015 | Okabe | A63B 37/0039 |
| 9,221,927 B2* | 12/2015 | Shigemitsu | C08F 20/02 |
| 9,345,932 B2* | 5/2016 | Shigemitsu | A63B 37/0059 |
| 9,345,933 B2* | 5/2016 | Shigemitsu | A63B 37/0076 |
| 9,346,898 B2* | 5/2016 | Shiga | C08F 20/04 |
| 2003/0158312 A1* | 8/2003 | Chen | C08K 5/098 524/394 |
| 2009/0036234 A1 | 2/2009 | Nanba et al. | |
| 2009/0111612 A1 | 4/2009 | Nanba et al. | |
| 2012/0184395 A1 | 7/2012 | Kasashima | |

FOREIGN PATENT DOCUMENTS

| | | |
|---|---|---|
| JP | 2006-43448 A | 2/2006 |
| JP | 2006-95287 A | 4/2006 |
| JP | 2008-161582 A | 7/2008 |
| JP | 2009-34505 A | 2/2009 |
| JP | 2009-106739 A | 5/2009 |
| JP | 2012-148072 A | 8/2012 |

\* cited by examiner

GOLF BALL RESIN COMPOSITION AND GOLF BALL

FIELD OF THE INVENTION

The present invention relates to a golf ball resin composition and a golf ball using the golf ball resin composition.

DESCRIPTION OF THE RELATED ART

As a resin component constituting a cover, intermediate layer or the like of a golf ball, a thermoplastic resin such as an ionomer resin and a polyurethane resin is used. Since the ionomer resin exhibits high stiffness, if the ionomer resin is used for a constituent member of the golf ball, the golf ball traveling a long distance is obtained. Thus, the ionomer resin is widely used as a material for the intermediate layer or cover constituting the golf ball (for example, Japanese Patent Publications No. 2012-148072 A and No. 2008-161582 A).

In addition, a method of blending, in addition to the resin component, a filler such as an organic short fiber, metal or clay mineral into the constituent member of the golf ball to improve the golf ball performance, has been proposed. For example, Japanese Patent Publication No. 2006-095287 A discloses a golf ball having a core, an intermediate layer and a cover, wherein the intermediate layer is formed from a resin composition containing a cation-treated layered silicate (refer to claim 1 of No. 2006-095287 A). Japanese Patent Publication No. 2006-043448 A discloses a golf ball having a core and an outer layer part, wherein the outer layer part is formed from a resin composition containing a cation-treated layered silicate in a resin matrix (refer to claim 1 of No. 2006-043448 A).

Further, for a golf ball, a good shot feeling at hitting is also desired, as well as a long traveling distance. Therefore, a technology of controlling a golf ball construction so as to strike a good balance between the flight performance and the shot feeling has been proposed.

For example, Japanese Patent Publications No. H10-328325 A and No. H10-328326 A disclose a multi-piece solid golf ball comprising a core and a cover covering the core, wherein the core comprises an inner core ball and a surrounding layer covering the inner core ball; the cover comprises an external layer and an internal layer; and the external cover layer hardness, the internal cover layer hardness, the surface hardness of the surrounding layer and the surface hardness of the inner core ball are defined within specified ranges, such that the golf ball shows an improved shot feeling without deteriorating the flight performance (refer to paragraph 0007 of No. H10-328325 A, and paragraph 0007 of No. H10-328326 A).

Further, Japanese Patent Publications No. 2009-034505 A and No. 2009-106739 A disclose a three-piece golf ball, wherein an inner cover layer thereof is primarily formed from a highly neutralized ionomer, and an outer cover layer thereof is thickly formed, such that the golf ball travels a greater distance and shows a better shot feeling (refer to paragraph 0008 of No. 2009-034505 A, and paragraph 0008 of No. 2009-106739 A).

SUMMARY OF THE INVENTION

For a golf ball, both a long flight distance and a good shot feeling are desired. Thus, it is necessary for a golf ball resin composition to have both a high resilience and flexibility. In addition, the injection molding method has a better productivity than the compression molding method, when manufacturing a constituent member of a golf ball. For this reason, a high fluidity as well as the high resilience and flexibility is desired for a material. However, among the conventional golf ball resin compositions, a high performance golf ball resin composition that satisfies a high resilience, flexibility and high fluidity does not exist.

The present invention has been achieved in view of the above problems. An object of the present invention is to provide a golf ball resin composition having a high resilience, flexibility and high fluidity.

The present invention that has solved the above problems provides a golf ball resin composition having a bending stiffness ($M_{21-30}$) ranging from 600 kgf/cm$^2$ to 5,000 kgf/cm$^2$ within a bending angle from 21° to 30°, a rebound resilience (R) of 50% or more, a slab hardness ranging from 40 to 65 in Shore D hardness and a melt flow rate (190° C., 2.16 kgf) of 1.0 g/10 min or more, and satisfying an equation of $(M_{21-30})^{0.5} \times (R/100)^3 \leq 8.5$.

If the golf ball resin composition has a bending stiffness ($M_{21-30}$), rebound resilience (R), Shore D hardness and melt flow rate falling within the above ranges, and the bending stiffness ($M_{21-30}$) and rebound resilience (R) thereof satisfy the above equation, the golf ball resin composition becomes a material having a high resilience performance, excellent flexibility and excellent fluidity. Accordingly, if a constituent member of a golf ball is formed by using such the golf ball resin composition, a golf ball having a high productivity and excellent flight performance and shot feeling is obtained.

The present invention further provides a golf ball comprising a spherical core, at least one intermediate layer covering the spherical core, and a cover covering the intermediate layer, wherein at least one of the intermediate layers is formed from the above golf ball resin composition.

A golf ball largely deforms at hitting. At this time, a compression deformation occurs at a part of the intermediate layer that is in contact with the club face with accompanying a bending deformation around the part that is in contact with the club face (a part that is not in contact with the club face). Both of a repulsive force produced when the compression deformation recovers to the original state and a restoration force produced when the bending deformation recovers to the original state affect the resilience performance of the golf ball. Herein, the bending deformation of the intermediate layer occurring when the golf ball is hit corresponds to a bending deformation within a bending angle from 21° to 30°. Accordingly, if the golf ball resin composition has the bending stiffness ($M_{21-30}$) and rebound resilience (R) falling within the above ranges, the resultant constituent member has an improved resilience performance.

In addition, the present inventors have found that the resilience index value $((M_{21-30})^{0.5} \times (R/100)^3)$ calculated from the bending stiffness ($M_{21-30}$) and the rebound resilience (R) positively correlates to the resilience performance of the golf ball. In other words, the resilience performance of the golf ball can be more certainly improved by making the resilience index value become 8.5 or more as well as controlling each of the bending stiffness ($M_{21-30}$) and the rebound resilience (R) independently. Further, if the golf ball resin composition has the slab hardness falling within the above range, the resultant intermediate layer becomes flexible. Accordingly, the golf ball comprising the intermediate layer formed from the above golf ball resin composition is excellent in the flight performance and shot feeling.

According to the present invention, a golf ball resin composition having a high resilience performance, excellent flexibility and excellent fluidity is obtained. In addition, if the golf ball resin composition according to the present invention is used, a golf ball having a high productivity and excellent flight performance and shot feeling is obtained.

DESCRIPTION OF THE PREFERRED EMBODIMENT

Figure 1:
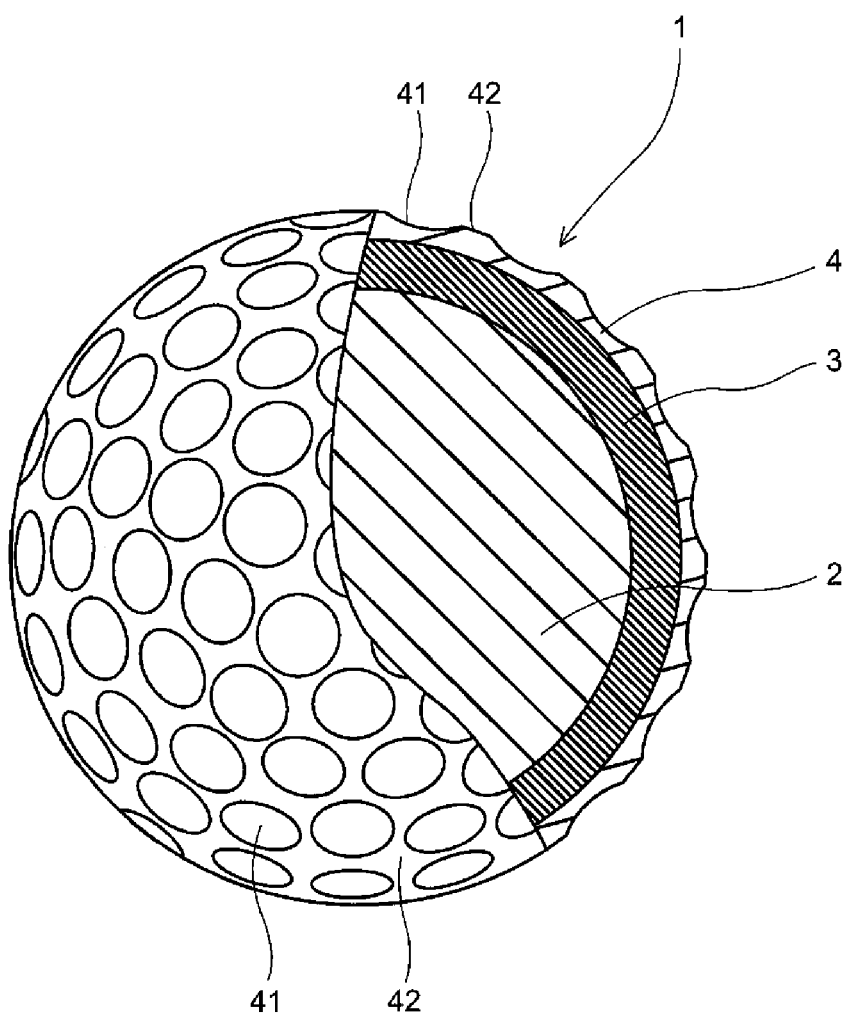
FIG. 1 is a partially cutaway view of a golf ball of one embodiment according to the present invention.

The present invention provides a golf ball resin composition having a bending stiffness ($M_{21-30}$) ranging from 600 kgf/cm² to 5,000 kgf/cm² within a bending angle from 21° to 30°, a rebound resilience (R) of 50% or more, a slab hardness ranging from 40 to 65 in Shore D hardness, a melt flow rate (190° C., 2.16 kgf) of 1.0 g/10 min or more, and a resilience index value ($(M_{21-30})^{0.5} \times (R/100)^3$) of 8.5 or more.

The bending stiffness ($M_{21-30}$) within a bending angle from 21° to 30° of the golf ball resin composition is 600 kgf/cm² (58.8 MPa) or more, preferably 700 kgf/cm² (69 MPa) or more, more preferably 800 kgf/cm² (79 MPa) or more, and is 5,000 kgf/cm² (490 MPa) or less, preferably 4,000 kgf/cm² (393 MPa) or less, more preferably 3,000 kgf/cm² (294 MPa) or less. If the bending stiffness ($M_{21-30}$) falls within the above range, the resilience to the bending deformation when the golf ball is hit becomes large. Accordingly, the constituent member formed from the golf ball resin composition has an improved resilience, and thus the obtained golf ball has an improved flight performance.

The bending stiffness ($M_{3-12}$) within a bending angle from 3° to 12° of the golf ball resin composition is preferably 500 kgf/cm² (49.0 MPa) or more, more preferably 600 kgf/cm² (58.8 MPa) or more, even more preferably 800 kgf/cm² (78.5 MPa) or more, and is preferably 10,000 kgf/cm² (980.7 MPa) or less, more preferably 8,000 kgf/cm² (784.5 MPa) or less, even more preferably 6,000 kgf/cm² (588.4 MPa) or less. If the bending stiffness ($M_{3-12}$) is 500 kgf/cm² or more, the golf ball has better resilience since the golf ball deforms a little when being hit, and the hitting energy can be efficiently converted to accelerate the golf ball. In addition, if the bending stiffness ($M_{3-12}$) is 10,000 kgf/cm² or less, a golf ball has a better flexibility and may suppress impact when being hit, resulting in a better shot feeling. It is preferred that the golf ball resin composition has a ratio ($M_{3-12}/M_{21-30}$) of the bending stiffness ($M_{3-12}$) to the bending stiffness ($M_{21-30}$) ranging from 0.80 to 2.00.

The rebound resilience (R) of the golf ball resin composition is 50% or more, preferably 55% or more, more preferably 60% or more. The upper limit of the rebound resilience (R) is 100%. If the rebound resilience (R) falls within the above range, the repulsive force to the compression deformation when the golf ball is hit becomes large. Accordingly, the constituent member formed from the golf ball resin composition has an improved resilience, and thus the obtained golf ball has an improved flight performance.

The slab hardness of the golf ball resin composition is 40 or more, preferably 45 or more, more preferably 50 or more, and is 65 or less, preferably 63 or less, more preferably 60 or less in Shore D hardness. If the slab hardness is 40 or more in Shore D hardness, the constituent member formed from the golf ball resin composition deforms a little at hitting, thus the durability improves. In addition, if the slab hardness is 65 or less in Shore D hardness, the golf ball resin composition has an improved flexibility. Accordingly, the obtained golf ball has an improved shot feeling since the constituent member formed from the golf ball resin composition has an improved flexibility.

The resilience index value ($(M_{21-30})^{0.5} \times (R/100)^3$) of the golf ball resin composition is 8.5 or more, preferably 9.0 or more, more preferably 10 or more, and is preferably 20 or less, more preferably 17 or less, even more preferably 15 or less. If the resilience index value is 8.5 or more, the obtained golf ball has a further improved resilience, and if the resilience index value is 20 or less, the constituent member formed from the golf ball resin composition has an improved flexibility, and thus the golf ball has an improved shot feeling.

The melt flow rate (hereinafter sometimes referred to as "MFR") (190° C., 2.16 kgf) of the golf ball resin composition is 1.0 g/min or more, preferably 1.5 g/min or more, more preferably 2.0 g/min or more, and is preferably 100 g/min or less, more preferably 80 g/10 min or less, even more preferably 50 g/10 min or less. If the MFR of the golf ball resin composition falls within the above range, the constituent member of the golf ball has better moldability.

[Material]

The material used for the golf ball resin composition is not particularly limited as long as the bending stiffness, rebound resilience, slab hardness and MFR of the resultant golf ball resin composition satisfy the above requirements, and a conventionally known material can be used.

[(A) Resin Component]

The golf ball resin composition comprises a thermoplastic resin as a resin component. Examples of the thermoplastic resin include a thermoplastic resin such as an ionomer resin, a thermoplastic olefin copolymer, a thermoplastic polyamide, a thermoplastic polyurethane, a thermoplastic styrene-based resin, a thermoplastic polyester, a thermoplastic acrylic resin, a thermoplastic polyolefin, a thermoplastic polydiene, a thermoplastic polyether, and the like. Among these thermoplastic resins, a thermoplastic elastomer having a rubber elasticity is preferable. Examples of the thermoplastic elastomer include a thermoplastic polyurethane elastomer, a thermoplastic polyamide elastomer, a thermoplastic styrene-based elastomer, a thermoplastic polyester elastomer, a thermoplastic acrylic-based elastomer, and the like.

(A) The resin component preferably contains (a-1) a binary copolymer composed of an olefin and an α,β-unsaturated carboxylic acid having 3 to 8 carbon atoms (hereinafter sometimes referred to as "(a-1) a binary copolymer"), (a-2) an ionomer resin consisting of a metal ion-neutralized product of a binary copolymer composed of an olefin and an α,β-unsaturated carboxylic acid having 3 to 8 carbon atoms (hereinafter sometimes referred to as "(a-2) a binary ionomer resin"), (a-3) a ternary copolymer composed of an olefin, an α,β-unsaturated carboxylic acid having 3 to 8 carbon atoms and an α,β-unsaturated carboxylic acid ester (hereinafter sometimes referred to as "(a-3) a ternary copolymer"), or (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester (hereinafter sometimes referred to as "(a-4) a ternary ionomer resin"). These (a-1) binary copolymer, (a-2) binary ionomer resin, (a-3) ternary copolymer and (a-4) ternary ionomer resin may be used solely, or at least two of them may be used in combination.

The content of (a-1) the binary copolymer, (a-2) the binary ionomer resin, (a-3) the ternary copolymer and (a-4) the ternary ionomer resin in (A) the resin component is preferably 50 mass % or more, more preferably 60 mass % or more, even more preferably 70 mass % or more.

The (a-1) component is a nonionic binary copolymer composed of an olefin and an α,β-unsaturated carboxylic acid having 3 to 8 carbon atoms wherein carboxyl groups thereof are not neutralized. In addition, the (a-2) component is an ionomer resin obtained by neutralizing at least a part of carboxyl groups in a binary copolymer composed of an olefin and α,β-unsaturated carboxylic acid having 3 to 8 carbon atoms with a metal ion.

The (a-3) component is a nonionic ternary copolymer composed of an olefin, an α,β-unsaturated carboxylic acid having 3 to 8 carbon atoms and an α,β-unsaturated carboxylic acid ester wherein carboxyl groups thereof are not neutralized. In addition, the (a-4) component is an ionomer resin obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion.

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

Preferable examples of (a-1) the binary copolymer include a binary copolymer composed of ethylene and (meth)acrylic acid, and preferable examples of (a-2) the binary ionomer resin include a metal ion-neutralized product of a binary copolymer composed of ethylene and (meth)acrylic acid. Preferable examples of (a-3) the ternary copolymer include a ternary copolymer composed of ethylene, (meth)acrylic acid and (meth)acrylic acid ester, and preferable examples of (a-4) the ternary ionomer resin include a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in the (a-1) the binary copolymer or (a-3) the ternary copolymer is preferably 4 mass % or more, more preferably 7 mass % or more, even more preferably 8 mass % or more, particularly preferably 9 mass % or more, and is preferably 30 mass % or less, more preferably 25 mass % or less, particularly preferably 20 mass % or less.

The MFR (190° C., 2.16 kgf) of the (a-1) the binary copolymer or (a-3) the ternary copolymer is preferably 5 g/10 min or more, more preferably 10 g/10 min or more, even more preferably 15 g/10 min or more, and is preferably 1,700 g/10 min or less, more preferably 1,500 g/10 min or less, even more preferably 1,300 g/10 min or less. If the MFR (190° C., 2.16 kgf) of (a-1) the binary copolymer or (a-3) the ternary copolymer is 5 g/10 min or more, the golf ball resin composition has a better fluidity, and thus the constituent member may be easily molded. In addition, if the MFR (190° C., 2.16 kgf) of (a-1) the binary copolymer or (a-3) the ternary copolymer is 1700 g/10 min or less, the obtained golf ball has better durability.

Examples of (a-1) the binary copolymer include an ethylene-methacrylic acid copolymer such as NUCREL® N1560, N2060, N1108C, N0908C, N1050H, N2050H, N1110H and N0200H (commercially available from Mitsui-Du Pont Polychemicals Co., Ltd); an ethylene-acrylic acid copolymer such as PRIMACOR® 59801 (commercially available from Dow Chemical Company).

Examples of (a-3) the ternary copolymer include NUCREL® AN4318, AN4319 (commercially available from Mitsui-Du Pont Polychemicals Co., Ltd), NUCREL® AE (commercially available from E.I. du Pont de Nemours and Company), and PRIMACOR® AT310, AT320 (commercially available from Dow Chemical Company).

The content of the α,β-unsaturated carboxylic acid component having 3 to 8 carbon atoms in the (a-2) the binary ionomer resin is preferably 4 mass % or more, more preferably 7 mass % or more, even more preferably 8 mass % or more, particularly preferably 9 mass % or more, and is preferably 30 mass % or less, more preferably 25 mass % or less, particularly preferably 20 mass % or less. If the content of the α,β-unsaturated carboxylic acid component having 3 to 8 carbon atoms is 4 mass % or more, the constituent member having a desired hardness may be easily formed. In addition, if the content of the α,β-unsaturated carboxylic acid component having 3 to 8 carbon atoms is 30 mass % or less, since the hardness of the constituent member does not become excessively high, the obtained golf ball has better durability and shot feeling.

Examples of the metal ion for neutralizing at least a part of carboxyl groups of (a-2) the binary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

Examples of (a-2) the binary ionomer resin include Himilan® 1555 (Na), 1557 (Zn), 1605 (Na), 1706 (Zn), 1707 (Na), AM7311 (Mg), AM7329 (Zn) (commercially available from Mitsui-Du Pont Polychemicals Co., Ltd); Surlyn® 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) (commercially available from E.I. du Pont de Nemours and Company); and Iotek® 8000 (Na), 8030 (Na), 7010 (Zn), 7030 (Zn) (commercially available from Exxon-Mobil Chemical Corporation). (a-2) The binary ionomer resin exemplified above may be used alone or as a mixture of at least two of them. It is noted that Na, Zn, Li, Mg and the like described in the parentheses after the trade names indicate metal types of neutralizing metal ions of the binary ionomer resins.

The bending stiffness of (a-2) the binary ionomer resin is preferably 140 MPa or more, more preferably 150 MPa or more, even more preferably 160 MPa or more, and is preferably 550 MPa or less, more preferably 500 MPa or less, even more preferably 450 MPa or less. If the bending stiffness of (a-2) the binary ionomer resin is excessively low, the spin rate of the golf ball may increase and thus the flight distance of the golf ball may be lowered, and if the bending stiffness of (a-2) the binary ionomer resin is excessively high, the durability of the golf ball may be lowered.

The MFR (190° C., 2.16 kgf) of (a-2) the binary ionomer resin is preferably 0.1 g/10 min or more, more preferably 0.5 g/10 min or more, even more preferably 1.0 g/10 min or more, and is preferably 30 g/10 min or less, more preferably 20 g/10 min or less, even more preferably 15 g/10 min or less. If the MFR (190° C., 2.16 kgf) of (a-2) the binary ionomer resin is 0.1 g/10 min or more, the golf ball resin composition has a better fluidity, and thus, for example, a thin layer may be easily molded. In addition, if the MFR (190° C., 2.16 kgf) of (a-2) the binary ionomer resin is 30 g/10 min or less, the obtained golf ball has better durability.

The slab hardness of (a-2) the binary ionomer resin is preferably 50 or more, more preferably 55 or more, even more preferably 60 or more, and is preferably 75 or less, more preferably 73 or less, even more preferably 70 or less in Shore D hardness. If the slab hardness is 50 or more in Shore D hardness, the obtained constituent member has a high hardness. In addition, if the slab hardness is 75 or less in Shore D hardness, the obtained constituent member does not become excessively hard, and thus the golf ball has better durability.

The content of the α,β-unsaturated carboxylic acid component having 3 to 8 carbon atoms in (a-4) the ternary ionomer resin is preferably 2 mass % or more, more preferably 3 mass % or more, and is preferably 30 mass % or less, more preferably 25 mass % or less.

Examples of the metal ion for neutralizing at least a part of carboxyl groups of (a-4) the ternary ionomer resin include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

Examples of (a-4) the ternary ionomer resin include Himilan® AM7327 (Zn), 1855 (Zn), 1856 (Na), AM7331 (Na) (commercially available from Mitsui-Du Pont Polychemicals Co., Ltd); Surlyn 6320 (Mg), 8120 (Na), 8320 (Na), 9320 (Zn), 9320W (Zn), HPF1000 (Mg), HPF2000 (Mg) (commercially available from E.I. du Pont de Nemours and Company); and Iotek 7510 (Zn), 7520 (Zn) (commercially available from ExxonMobil Chemical Corporation). It is noted that Na, Zn, Mg and the like described in the parentheses after the trade names indicate metal types of neutralizing metal ions of the ternary ionomer resins. (a-4) The ternary ionomer resin may be used alone, or at least two of them may be used in combination.

The bending stiffness of (a-4) the ternary ionomer resin is preferably 50 MPa or more, more preferably 100 MPa or more, even more preferably 150 MPa or more, and is preferably 550 MPa or less, more preferably 500 MPa or less, even more preferably 450 MPa or less. If the bending stiffness of (a-4) the ternary ionomer resin is excessively low, the spin rate of the golf ball may increase and thus the flight distance of the golf ball may be lowered, and if the bending stiffness of (a-4) the ternary ionomer resin is excessively high, the durability of the golf ball may be lowered.

The MFR (190° C., 2.16 kgf) of (a-4) the ternary ionomer resin is preferably 0.1 g/10 min or more, more preferably 0.3 g/10 min or more, even more preferably 0.5 g/10 min or more, and is preferably 20 g/10 min or less, more preferably 15 g/10 min or less, even more preferably 10 g/10 min or less. If the MFR (190° C., 2.16 kgf) of (a-4) the ternary ionomer resin is 0.1 g/10 min or more, the golf ball resin composition has a better fluidity, and thus a thin layer may be easily molded. In addition, if the MFR (190° C., 2.16 kgf) of (a-4) the ternary ionomer resin is 20 g/10 min or less, the obtained golf ball has better durability.

The slab hardness of (a-4) the ternary ionomer resin is preferably 20 or more, more preferably 25 or more, even more preferably 30 or more, and is preferably 70 or less, more preferably 65 or less, even more preferably 60 or less in Shore D hardness. If the slab hardness is 20 or more in Shore D hardness, the obtained constituent member does not become excessively soft, and thus the golf ball has a better resilience. In addition, if the slab hardness is 70 or less in Shore D hardness, the obtained constituent member does not become excessively hard, and thus the golf ball has better durability.

[(B) Fatty Acid and/or Fatty Acid Metal Salt]

The golf ball resin composition preferably further comprises (B) a fatty acid and/or a fatty acid metal salt. If (B) the fatty acid and/or the fatty acid metal salt is comprised, the golf ball resin composition has a better fluidity, and thus the constituent member may be produced by the injection molding method. (B) The fatty acid and/or the fatty acid metal salt may be used alone, or at least two of them may be used in combination.

The fatty acid component of (B) the fatty acid and/or the fatty acid metal salt may be a linear chain fatty acid or a branched chain fatty acid. In addition, the carbon atom number of the fatty acid component of (B) the fatty acid and/or the fatty acid metal salt is preferably 4 or more, more preferably 12 or more, even more preferably 16 or more, and is preferably 30 or less, more preferably 28 or less, even more preferably 26 or less.

The content of (B) the fatty acid and/or the fatty acid metal salt in the golf ball resin composition is preferably 80 parts by mass or more, more preferably 90 parts by mass or more, even more preferably 100 parts by mass or more, and is preferably 200 parts by mass or less, more preferably 180 parts by mass or less, even more preferably 150 parts by mass or less, with respect to 100 parts by mass of (A) the resin component. If the content of the component (B) is 80 parts by mass or more, both of the rebound resilience and the bending stiffness become better, and thus a material having an excellent fluidity and flexibility is obtained. In addition, if the content of the component (B) is 200 parts by mass or less, lowering in the durability of the golf ball caused by the increased amount of low molecular weight components may be suppressed.

(B) The fatty acid preferably contains (b-1) a saturated fatty acid and/or a metal salt thereof and (b-2) an unsaturated fatty acid and/or a metal salt thereof.

Specific examples of (b-1) the saturated fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of (b-1) the saturated fatty acid (common name) include butyric acid (C4), valeric acid (C5), caproic acid (C6), enanthic acid (C7), caprylic acid (C8), pelargonic acid (C9), capric acid (C10), lauric acid (C12), myristic acid (C14), pentadecylic acid (C15), palmitic acid (C16), margaric acid (C17), stearic acid (C18), arachidic acid (C20), behenic acid (C22), lignoceric acid (C24), cerotic acid (C26), montanic acid (C28), and melissic acid (C30).

(b-1) The saturated fatty acid may be used solely, or at least two of them may be used in combination. Among them, preferable examples of the saturated fatty acid include palmitic acid, stearic acid, arachidic acid, behenic acid, lignoceric acid and montanic acid.

(b-2) The unsaturated fatty acid is not particularly limited, as long as it is a fatty acid having at least one unsaturated bond in the hydrocarbon chain thereof. Examples of the unsaturated bond include a carbon-carbon double bond and a carbon-carbon triple bond, and the carbon-carbon double bond is preferred because the molecular chain easily bends. In addition, examples of the carbon-carbon double bond include a cis-double bond and a trans-double bond, and the cis-double bond is more preferred.

Specific examples of (b-2) the unsaturated fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of (b-2) the unsaturated fatty acid (common name) include myristoleic acid (C14), palmitoleic acid (C16), stearidonic acid (C18), elaidic acid (C18), vaccenic acid (C18), oleic acid (C18), linoleic acid (C18), linolenic acid (C18), elaidic acid (C18), gadoleic acid (C20), arachidonic acid (C20), eicosenoic acid (C20), eicosapentaenoic acid (C20), eicosadienoic acid (C20), docosahexaenoic acid (C22), erucic acid (C22), and nervonic acid (C24).

(b-2) The unsaturated fatty acid may be used solely, or at least two of them may be used in combination. Among them, preferable examples of (b-2) the unsaturated fatty acid include palmitoleic acid, oleic acid, linoleic acid and arachidonic acid.

The mass ratio ((b-1)/(b-2)) of (b-1) the saturated fatty acid to (b-2) the unsaturated fatty acid is preferably 0.1 or more, more preferably 0.18 or more, even more preferably 0.25 or more, particularly preferably 0.43 or more, and is preferably 9.0 or less, more preferably 5.7 or less, even more preferably 4.0 or less, particularly preferably 2.3 or less. If the mass ratio ((b-1)/(b-2)) falls within the above range, both of the rebound resilience and the bending stiffness become better, and thus a material having an excellent fluidity and flexibility is easily obtained.

[(C) Metal Compound]

The golf ball resin composition may further comprise (C) a metal compound. (C) The metal compound is employed to neutralize unneutralized carboxyl groups of the golf ball resin composition, and may be added where necessary. Examples of (C) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. These (C) metal compounds may be used solely, or at least two of them may be used in combination.

[(D) Amphoteric Surfactant]

The golf ball resin composition may further comprise (D) an amphoteric surfactant. It is considered that (D) the amphoteric surfactant is taken into the ion association of the ionomer resin, and finely disperses the ion association to inhibit crystallization of ethylene chains or weakens constraining of main chains by the ion association. With these actions, the mobility of the molecular chain of the golf ball resin composition according to the present invention increases, and thus the resilience of the golf ball resin composition according to the present invention increases while retaining the flexibility.

(D) The amphoteric surfactant is not particularly limited, as long as it has a cationic part and an anionic part within the molecule, and has an action of lowering surface tension when being dissolved in water. Examples of (D) the amphoteric surfactant include a betaine type amphoteric surfactant such as an alkylbetaine type, amidobetaine type, imidazoliumbetaine type, alkylsulfobetain type, amidosulfobetain type, and the like; an amidoamino acid type amphoteric surfactant and an alkylamino fatty acid salt; an alkylamine oxide; α β-alanine type amphoteric surfactant and a glycine type amphoteric surfactant; a sulfobetaine type amphoteric surfactant; a phosphobetaine type amphoteric surfactant; and the like. (D) The amphoteric surfactant may be used solely, or at least two of them may be used in combination.

Specific examples of the amphoteric surfactant include dimethyllaurylbetaine, oleylbetaine, dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, N,N-dimethylstearylamine oxide, and the like.

The content of (D) the amphoteric surfactant is preferably 1 part by mass or more, more preferably 3 parts by mass or more, even more preferably 5 parts by mass or more, and is preferably 20 parts by mass or less, more preferably 15 parts by mass or less, even more preferably 10 parts by mass or less, with respect to 100 parts by mass of (A) the resin component. If the content of (D) the amphoteric surfactant falls within the above range, the surfactant molecule is easily taken into the ion association of the ionomer resin, thus the mobility of the molecular chain of the ionomer resin increases, and the resilience of the golf ball resin composition increases while retaining the flexibility.

The neutralization degree of the golf ball resin composition is preferably more than 80 mole %, more preferably 85 mole % or more, even more preferably 90 mole % or more, and is preferably 160 mole % or less, more preferably 150 mole % or less, even more preferably 140 mole % or less. If the neutralization degree is more than 80 mole %, the amount of the ion association increases, and thus the golf ball resin composition has greater resilience. If the neutralization degree is 160 mole % or less, the golf ball resin composition has better fluidity. It is noted that the neutralization degree of the golf ball resin composition is defined by the following formula.

Neutralization degree(mole %)=100×[Σ(mole number of cation component×valence of cation component)]/[Σ(mole number of anion component× valence of anion component)]

In the formula, Σ(mole number of cation component× valence of cation component) is a sum of a product obtained by multiplying the mole number of the cation component by the valence of the cation component in the component (A) and a product obtained by multiplying the mole number of the cation component by the valence of the cation component in the component (B). It is noted that, when the golf ball resin composition further comprises the component (C) and/or the component (D), Σ(mole number of cation component×valence of cation component) further includes a product obtained by multiplying the mole number of the cation-forming group or cation component by the valence of the cation-forming group or cation component in the component (C) and/or the component (D).

In the formula, Σ(mole number of anion component× valence of anion component) is a sum of the mole number of the carboxyl group in the component (A) and the mole number of the carboxyl group in the component (B). It is noted that, when the golf ball resin composition further comprises the component (D), Σ(mole number of anion component×valence of anion component) further includes a product obtained by multiplying the mole number of the anion-forming group by the valence of the anion-forming group in the component (D).

It is noted that, in the formula, the cation component, cation-forming group, carboxyl group and anion-forming group include an unionized precursor. The amount of the cation component, the amount of the cation-forming group and the amount of the anion-forming group may be determined, for example, by a neutralization titration method.

For example, when the golf ball resin composition comprises the component (A), component (B), component (C) and component (D), Σ(mole number of cation component× valence of cation component) is a sum of a product obtained by multiplying the mole number of the metal ion by the valence of the metal ion in the component (A), component (B), component (C) and component (D), and a product obtained by multiplying the mole number of the cation-forming group by the valence of the cation-forming group in the component (D), and Σ(mole number of anion component×valence of anion component) is a total mole number of the carboxyl groups in the component (A), component (B) and component (D).

[(E) Filler]

The golf ball resin composition may further comprise (E) a filler. As (E) the filler, the conventional filler may be used. As (E) the filler, (e-1) a metal filler having a surface coated with a polymer and (e-2) a carbonaceous filler having a polar functional group on the surface thereof are preferably used.

(e-1) The metal filler having a surface coated with a polymer is not particularly limited, and is preferably a metal filler obtained by coating the surface of at least one metal selected from the group consisting of aluminum, titanium, zinc, chromium, iron, nickel, tin and copper with a polymer composed of an α,β-unsaturated carboxylic acid and/or a derivate thereof. The metal filler having a surface coated with a polymer has good compatibility with (A) the thermoplastic resin, and thus the reinforcement effect by the filler becomes larger.

The α,β-unsaturated carboxylic acid constituting the polymer is not particularly limited, and is preferably an α,β-unsaturated carboxylic acid having 3 to 8 carbon atoms. Examples of the α,β-unsaturated carboxylic acid include (meth)acrylic acid, fumaric acid, maleic acid, and crotonic acid.

Examples of the derivate of the α,β-unsaturated carboxylic acid include an α,β-unsaturated carboxylic acid ester, an α,β-unsaturated carboxylic acid halide, and an α,β-unsaturated carboxylic acid imidazole. In particular, a (meth)acrylic acid ester such as (meth)acrylic acid methyl ester, (meth)acrylic acid ethyl ester, (meth)acrylic acid n-propyl ester, (meth)acrylic acid i-propyl ester, (meth)acrylic acid 1-methylpropyl ester, (meth)acrylic acid 2-methylpropyl ester, (meth)acrylic acid n-butyl ester and (meth)acrylic acid t-butyl ester; a (meth)acrylic acid halide such as (meth) acrylic acid chloride and (meth)acrylic acid bromide; and a (meth)acrylic acid imidazole are preferred.

The polymer composed of the α,β-unsaturated carboxylic acid and/or the derivate thereof is preferably a polymer composed of (meth)acrylic acid and/or the derivate of (meth)acrylic acid. Examples of the polymer composed of (meth)acrylic acid and/or the derivate of (meth)acrylic acid include a homopolymer of (meth)acrylic acid, and a copolymer of (meth)acrylic acid and (meth)acrylic acid ester. The polymer may be one kind, or at least two kinds of the polymer may be used in combination. Here, (meth)acrylic acid means acrylic acid and/or methacrylic acid.

The average diameter of (e-1) the metal filler in the transverse direction is preferably 0.1 µm or more, and is preferably 200 µm or less, more preferably 30 µm or less, even more preferably 0.5 µm or less. If the average diameter of the filler in the transverse direction falls within the above range, the golf ball having excellent resilience while retaining a soft shot feeling is easily obtained.

The average length of (e-1) the metal filler in the longitudinal direction is preferably 0.5 µm or more, more preferably 5 µm or more, and is preferably 300 µm or less, more preferably 100 µm or less, even more preferably 20 µm or less. If the average length of the filler in the longitudinal direction falls within the above range, the golf ball having excellent resilience while retaining a soft shot feeling is easily obtained.

The average aspect ratio of (e-1) the metal filler is preferably 1.5 or more, more preferably 3.3 or more, even more preferably 10 or more, and is preferably 3,000 or less, more preferably 1,000 or less, even more 200 or less. If the average aspect ratio of (e-1) the metal filler falls within the above range, the golf ball having excellent resilience while retaining a soft shot feeling is easily obtained. It is noted that, in the present invention, the average aspect ratio means a ratio (average length in longitudinal direction/average diameter in transverse direction) of the average length of the filler in the longitudinal direction to the average diameter of the filler in the transverse direction.

The amount of (e-1) the metal filler is not particularly limited, but is preferably 1 part by mass or more, more preferably 2 parts by mass or more, even more preferably 3 parts by mass or more, and is preferably 25 parts by mass or less, more preferably 20 parts by mass or less, even more preferably 15 parts by mass or less, with respect to 100 parts by mass of (A) the thermoplastic resin. If the amount of the metal filler falls within the above range, the golf ball having excellent resilience while retaining a soft shot feeling is easily obtained.

It is noted that the average length and average diameter of (e-1) the metal filler may be measured by a graphic imaging method. Specifically, the microscope photograph of the particles are analyzed with an image analysis software (for example, Viewtrac® commercially available from Nikkiso Co., Ltd.). The average length and average diameter are a number-based median average (d50) size in the certain direction of the particles in the microscope photograph.

(e-1) The metal filler preferably has a polar functional group on the surface thereof. Examples of the polar functional group include a carboxyl group (—COOH), hydroxyl group (—OH), amino group (—NH$_2$), thiol group (—SH), sulfo group (—SO$_3$H), and phosphonic acid group (—PO(OH)$_2$).

The amount of the polar functional group per unit mass of (e-1) the metal filler is preferably 0.2 µg/g or more, more preferably 10 µg/g or more, even more preferably 40 µg/g or more, and is preferably 300 µg/g or less, more preferably 220 µg/g or less, even more preferably 150 µg/g or less. If the amount of the polar functional group is 0.2 µg/g or more, the golf ball resin composition has larger bending stiffness, and thus the obtained golf ball has better flight performance. In addition, if the amount of the polar functional group is 300 µg/g or less, the golf ball resin composition does not become excessively hard, and thus the obtained golf ball has better shot feeling.

It is noted that the amount of the polar functional group of (e-1) the metal filler may be measured by utilizing thermogravimetric analysis and microscope FTIR analysis in combination. Specifically, the coating amount of the coating agent is measured by thermogravimetric analysis, and the amount of the polar functional group in the coating agent is measured by microscope FTIR analysis, based on these measurement results, the amount of the polar functional group of (e-1) the metal filler can be calculated.

Examples of (e-2) the carbonaceous filler having a polar functional group on the surface thereof include a carbonaceous filler having a polar functional group directly bonded to the carbonaceous filler, and a carbonaceous filler having a polymer coated on the surface thereof wherein the polymer has a polar functional group. Examples of the polymer include those utilized for (e-1) the metal filler.

Examples of the material of (e-2) the carbonaceous filler having a polar functional group on the surface thereof include a natural graphite, synthetic graphite, carbon fiber, and carbon black. Among them, graphite is preferred, graphene and a graphite flake are particularly preferred. It is noted that graphene is a sheet composed of a single layer having one atom thickness from graphite.

Examples of the polar functional group include a carboxyl group (—COOH), hydroxyl group (—OH), amino group (—NH$_2$), thiol group (—SH), sulfo group (—SO$_3$H), and phosphonic acid group (—PO(OH)$_2$).

The amount of the polar functional group per unit mass of (e-2) the carbonaceous filler is preferably 0.3 mmol/g or more, more preferably 0.5 mmol/g or more, even more preferably 1.0 mmol/g or more, and is preferably 5.0 mmol/g or less, more preferably 3.0 mmol/g or less, even more preferably 2.5 mmol/g or less. If the amount of the polar functional group is 0.3 mmol/g or more, the golf ball resin composition has greater bending stiffness, and if the amount of the polar functional group is 5.0 mmol/g or less, the golf ball resin composition has better fluidity. It is noted that the amount of the polar functional group of the carbonaceous filler may be measured by titration or X-ray photoelectron spectroscopy.

The average diameter of (e-2) the carbonaceous filler in the transverse direction is preferably 0.1 µm or more, more preferably 0.5 µm or more, even more preferably 1.0 µm or more, and is preferably 100 µm or less, more preferably 90 µm or less, even more preferably 80 µm or less. If the average diameter of (e-2) the carbonaceous filler in the transverse direction is 0.1 µm or more, the golf ball resin composition has greater bending stiffness, and if the average diameter of (e-2) the carbonaceous filler in the transverse direction is 100 µm or less, the golf ball resin composition has better fluidity and flexibility.

The average diameter of (e-2) the carbonaceous filler in the longitudinal direction is preferably 0.2 µm or more, more preferably 3.0 µm or more, even more preferably 5.0 µm or more, and is preferably 300 µm or less, more preferably 280 µm or less, even more preferably 250 µm or less. If the average diameter of (e-2) the carbonaceous filler in the longitudinal direction is 0.2 µm or more, the golf ball resin composition has greater bending stiffness, and if the average diameter of (e-2) the carbonaceous filler in the longitudinal direction is 300 µm or less, the golf ball resin composition has better fluidity and flexibility.

The average aspect ratio of (e-2) the carbonaceous filler is preferably 2.0 or more, more preferably 5.0 or more, even more preferably 10 or more, and is preferably 1,000 or less, more preferably 800 or less, even more preferably 600 or less. If the average aspect ratio of (e-2) the carbonaceous filler is 2.0 or more, the golf ball resin composition has greater bending stiffness, and if the average aspect ratio of (e-2) the carbonaceous filler is 1,000 or less, the golf ball resin composition has better fluidity and flexibility.

The average thickness of (e-2) the carbonaceous filler is preferably 0.3 nm or more, more preferably 0.5 nm or more, even more preferably 1.0 nm or more, and is preferably 50 nm or less, more preferably 40 nm or less, even more preferably 30 nm or less. If the average thickness of (e-2) the carbonaceous filler is 0.3 nm or more, the golf ball resin composition has greater bending stiffness, and if the average thickness of (e-2) the carbonaceous filler is 50 nm or less, the golf ball resin composition has better flexibility.

The average diameter in the transverse direction, average diameter in the longitudinal direction and thickness are decided by side lengths of the circumscribed cube of the particle. In other words, for the circumscribed cube of the particle, the long axis thereof having the longest axis is regarded as the long diameter (length), the short axis thereof having the shortest axis is regarded as the thickness (height), and the width thereof is regarded as the short diameter (width). The number-based average diameter in the transverse direction, average diameter in the longitudinal direction and thickness of (e-2) the carbonaceous filler are obtained by measuring the short diameter, long diameter and thickness of at least 50 particles with a scanning electron microscope (XL30ESEM commercially available from Philips company), and calculating the average value thereof.

The amount of (e-2) the carbonaceous filler is preferably 1 part by mass or more, more preferably 8 parts by mass or more, even more preferably 10 parts by mass or more, and is preferably 30 parts by mass or less, more preferably 25 parts by mass or less, with respect to 100 parts by mass of (A) the thermoplastic resin. If the amount of (e-2) the carbonaceous filler is 1 part by mass or more, the golf ball resin composition has greater bending stiffness, and if the amount of (e-2) the carbonaceous filler is 30 parts by mass or less, the golf ball resin composition has better flexibility.

The golf ball resin composition may further comprise a pigment component such as a white pigment (e.g. titanium oxide) and a blue pigment, a weight adjusting agent, a dispersant, an antioxidant, an ultraviolet absorber, a light stabilizer, a fluorescent material or a fluorescent brightener, as long as they do not impair the performance of the golf ball.

The content of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component. If the content of the white pigment is 0.5 part by mass or more, it is possible to impart the opacity to the resultant golf ball constituent member. In addition, if the content of the white pigment exceeds 10 parts by mass, the durability of the resultant golf ball may deteriorate.

The golf ball resin composition according to the present invention may be obtained, for example, by melt blending (A) the resin component, and where necessary (B) the fatty acid and/or the fatty acid metal salt, (C) the metal compound, (D) the amphoteric surfactant, (E) the filler and other additives. The melt blending may be carried out using a kneader or an extruder (e.g. single-screw extruder, twin-screw extruder, and twin-single screw extruder).

[Golf Ball]

Examples of the golf ball according to the present invention include a three-piece golf ball comprising a core, a single-layered intermediate layer disposed around the core, and a cover disposed around the intermediate layer, and a multi-piece golf ball (including the three-piece golf ball mentioned above) comprising a core, at least one intermediate layer disposed around the core, and a cover disposed around the intermediate layer, in which any one of the constituent members constituting the golf ball may be formed from the above golf ball resin composition. Among them, the golf ball comprising an intermediate layer formed from the golf ball resin composition according to the present invention is preferred.

Next, the golf ball according to the present invention will be explained in detail, with reference to the preferable embodiment which is a golf ball (including a three-piece golf ball) comprising a core, at least one intermediate layer disposed around the core, and a cover disposed around the intermediate layer, and in which at least one of the intermediate layers is formed from the golf ball resin composition according to the present invention. It is noted that the golf ball according to the present invention is not limited to this embodiment.

In the preferable embodiment, the core of the golf ball according to the present invention may be a single-layered core or a multi-layered core.

The core generally has a spherical shape, but a rib may be provided thereon to divide the surface of the spherical core. The core may be formed from a conventional rubber composition (hereinafter, sometimes simply referred to as "core rubber composition"). For example, the core may be formed by heat pressing a rubber composition containing a base rubber, a crosslinking initiator, a co-crosslinking agent and a filler.

As the base rubber, a natural rubber and/or a synthetic rubber may be used. Examples of the base rubber include a polybutadiene rubber, a natural rubber, a polyisoprene rubber, a styrene polybutadiene rubber, and an ethylene-propylene-diene rubber (EPDM). Among them, particularly preferred is a high cis-polybutadiene having a cis-bond which is beneficial to the resilience in a content of 40 mass % or more, preferably 70 mass % or more, more preferably 90 mass % or more.

The crosslinking initiator is blended to crosslink the base rubber component. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. Among them, dicumyl peroxide is preferably used. The content of the crosslinking initiator is preferably 0.3 part by mass or more, more preferably 0.4 part by mass or more, and is preferably 5 parts by mass or less, more preferably 3 parts by mass or less, with respect to 100 parts by mass of the base rubber. If the content of the crosslinking initiator is less than 0.3 part by mass, the core becomes so soft that the resilience of the golf ball tends to be lowered, and if the content of the crosslinking initiator is more than 5 parts by mass, the amount of the co-crosslinking agent must be decreased to obtain an appropriate hardness, which tends to cause insufficient resilience.

It is considered that the co-crosslinking agent has an action of crosslinking rubber molecules by graft polymerization to a molecular chain of the base rubber. As the co-crosslinking agent, for example, an α,β-unsaturated carboxylic acid having 3 to 8 carbon atoms or a metal salt thereof may be used. Preferable examples of the co-crosslinking agent include acrylic acid, methacrylic acid and metal salts thereof. Examples of the metal constituting the metal salt include zinc, magnesium, calcium, aluminum and sodium. Among them, the zinc salt is preferably used because the zinc salt provides high resilience to the golf ball.

The amount of the co-crosslinking agent is preferably 10 parts by mass or more, more preferably 15 parts by mass or more, even more preferably 20 parts by mass or more, and is preferably 55 parts by mass or less, more preferably 50 parts by mass or less, even more preferably 48 parts by mass or less, with respect to 100 parts by mass of the base rubber. If the amount of the co-crosslinking agent is less than 10 parts by mass, the amount of the crosslinking initiator must be increased to obtain an appropriate hardness, which tends to lower the resilience. On the other hand, if the amount of the co-crosslinking agent is more than 55 parts by mass, the core becomes so hard that the shot feeling may be lowered.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, molybdenum powder, and the like. The content of the filler is preferably 0.5 part by mass or more, more preferably 1 part by mass or more, and is preferably 30 parts by mass or less, more preferably 20 parts by mass or less, with respect to 100 parts by mass of the base rubber. If the content of the filler is less than 0.5 part by mass, it is difficult to adjust the weight, and if the content of the filler is more than 30 parts by mass, the weight fraction of the rubber component is reduced and thus the resilience tends to be lowered.

In the core rubber composition, an organic sulfur compound, an antioxidant or a peptizing agent may be blended appropriately, in addition to the base rubber, the crosslinking initiator, the co-crosslinking agent and the filler.

Examples of the organic sulfur compound include thiophenols, thionaphthols, polysulfides, thiocarboxylic acids, dithiocarboxylic acids, sulfenamindes, thiurams, dithiocarbamates and thiazoles. Among them, the thionaphthols are preferably used as the organic sulfur compound. Examples of the thionaphthols include 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, 1-acetyl- 2-thionaphthol and metal salts thereof. These thionaphthols can enhance the resilience of the core by having some influence on the vulcanization state of the vulcanized rubber. Among them, 1-thionaphthol, 2-thionaphthol and zinc salts thereof are particularly preferred since the golf ball having a high resilience may be easily obtained. The content of the organic sulfur compound is preferably 0.1 part by mass or more, more preferably 0.3 parts by mass or more, and is preferably 5.0 parts by mass or less, more preferably 3.0 parts by mass or less, with respect to 100 parts by mass of the base rubber.

The amount of the antioxidant is preferably 0.1 part by mass or more and 1 part by mass or less with respect to 100 parts by mass of the base rubber. In addition, the amount of the peptizing agent is preferably 0.1 part by mass or more and 5 parts by mass or less with respect to 100 parts by mass of the base rubber.

The core may be obtained by mixing and kneading the above mentioned core rubber composition, and molding the resultant core rubber composition in a mold. The conditions for molding the core rubber composition are not particularly limited, but molding is generally carried out at 130° C. to 200° C. under a pressure ranging from 2.9 MPa to 11.8 MPa for 10 to 60 minutes. For example, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

The core preferably has a diameter of 34.8 mm or more, more preferably 35.0 mm or more, even more preferably 35.2 mm or more, and preferably has a diameter of 41.2 mm or less, more preferably 41.0 mm or less, even more preferably 40.8 mm or less. If the core has a diameter of 34.8 mm or more, the thickness of the intermediate layer or the cover does not become too thick and thus the resilience becomes better. On the other hand, if the core has a diameter of 41.2 mm or less, the thickness of the intermediate layer or the cover does not become too thin and thus the intermediate layer or the cover functions better.

When the core has a diameter ranging from 34.8 mm to 41.2 mm, the compression deformation amount of the core (shrinking amount of the core along the compression direction) when applying a load from 98 N as an initial load to 1275 N as a final load to the core is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling of the golf ball becomes better, and if the compression deformation amount is 4.00 mm or less, the resilience of the golf ball becomes better.

The core preferably has a center hardness of 30 or more, more preferably 32 or more, even more preferably 35 or more in Shore D hardness. If the center hardness of the core is less than 30 in Shore D hardness, the core becomes so soft that the resilience thereof may be lowered. In addition, the core preferably has a center hardness of 70 or less, more preferably 65 or less, even more preferably 60 or less in Shore D hardness. If the center hardness of the core exceeds 70 in Shore D hardness, the core becomes so hard that the shot feeling thereof tends to be lowered. In the present invention, the center hardness of the core is a hardness measured with a Shore D type spring hardness tester at the central point of a cut plane which is obtained by equally cutting the core into two hemispheres.

The core preferably has a surface hardness of 45 or more, more preferably 50 or more, even more preferably 55 or more in Shore D hardness. In addition, the core preferably has a surface hardness of 85 or less, more preferably 80 or less, even more preferably 78 or less in Shore D hardness. If the surface hardness of the core is 45 or more in Shore D hardness, the core does not become excessively soft and thus the resilience thereof becomes better. In addition, if the surface hardness of the core is 85 or less in Shore D hardness, the core does not become excessively hard and thus the shot feeling thereof becomes better.

Examples of the method for forming the intermediate layer include a method of covering the core with the golf ball resin composition according to the present invention (hereinafter, sometimes simply referred to as "intermediate layer composition") to form the intermediate layer. The method for molding the intermediate layer is not particularly limited, and includes a method which comprises molding the golf ball resin composition into a hemispherical half shell beforehand, covering the core with two of the half shells and performing compression molding at 130° C. to 170° C. for 1 minute to 5 minutes; and a method which comprises injection molding the golf ball resin composition directly onto the core to cover the core. The intermediate layer of the golf ball according to the present invention is preferably formed by the injection molding method. If the injection molding method is employed, the molding of the intermediate layer becomes easier.

In the case of injection molding the intermediate layer composition onto the core to form the intermediate layer, it is preferred to use upper and lower molds, each having a hemispherical cavity and pimples wherein a part of the pimple also serves as a retractable hold pin. When molding the intermediate layer by the injection molding method, the hold pin is protruded to hold the core, and the intermediate layer composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the intermediate layer composition into the half shell may be carried out, for example, under a pressure of 1 MPa or more and 20 MPa or less at a temperature of −20° C. or more and +70° C. or less relative to the flow beginning temperature of the intermediate layer composition. If the molding is carried out under the above conditions, the half shell having a uniform thickness can be formed. Examples of the method for molding the intermediate layer by using the half shell include a method of covering the core with two of the half shells and performing compression molding. Compression molding the half shells into the intermediate layer may be carried out, for example, under a pressure of 0.5 MPa or more and 25 MPa or less at a temperature of −20° C. or more and +70° C. or less relative to the flow beginning temperature of the intermediate layer composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the intermediate layer composition may be measured using the intermediate layer composition in a pellet form under the following conditions with "Flow Tester CFT-500" commercially available from Shimadzu Corporation.

Measuring conditions: Plunger area: 1 cm$^2$, Die length: 1 mm, Die diameter: 1 mm, Load: 588.399 N, Starting temperature: 30° C., and Temperature increase rate: 3° C./min.

The intermediate layer preferably has a thickness of 0.5 mm or more, more preferably 0.6 mm or more, even more preferably 0.7 mm or more. If the thickness of the intermediate layer is 0.5 mm or more, the molding of the intermediate layer becomes easier and the obtained golf ball has enhanced durability. The intermediate layer preferably has a thickness of 15 mm or less, more preferably 14 mm or less, even more preferably 13 mm or less. If the thickness of the intermediate layer is 15 mm or less, the obtained golf ball has better resilience and shot feeling.

In the preferable embodiment, in the case that the golf ball according to the present invention comprises at least two intermediate layers, at least one of the intermediate layers may be formed from the golf ball resin composition according to the present invention, and an intermediate layer formed from an intermediate layer composition other than the golf ball resin composition according to the present invention may be comprised as long as this does not impair the effect of the present invention. In this case, the outermost intermediate layer is preferably formed from the golf ball resin composition according to the present invention. In addition, it is also preferred that all the intermediate layers are formed from the golf ball resin composition according to the present invention.

Examples of the intermediate layer composition other than the golf ball resin composition according to the present invention include the above mentioned core rubber composition and ionomer resin; a thermoplastic polyamide elastomer having a trade name of "Pebax®" (e.g. "Pebax 2533")" commercially available from Arkema K. K.; a thermoplastic polyester elastomer having a trade name of "Hytrel®" (e.g. "Hytrel 3548" and "Hytrel 4047")" commercially available from Du Pont-Toray Co., Ltd.; a thermoplastic polyurethane elastomer having a trade name of "Elastollan®" (e.g. "Elastollan XNY97A")" commercially available from BASF Japan Ltd; and a thermoplastic styrene elastomer having a trade name of "Rabalon®" commercially available from Mitsubishi Chemical Corporation. In addition, the intermediate layer composition may further contain a weight adjusting agent such as barium sulfate and tungsten, an antioxidant, a pigment, and the like.

In the preferable embodiment, the cover of the golf ball according to the present invention is formed from a cover composition containing a resin component. Examples of the resin component include an ionomer resin; a thermoplastic polyurethane elastomer having a trade name of "Elastollan®" (e.g. "Elastollan XNY97A")" commercially available from BASF Japan Ltd; a thermoplastic polyamide elastomer having a trade name of "Pebax®" (e.g. "Pebax 2533")" commercially available from Arkema K. K.; a thermoplastic polyester elastomer having a trade name of "Hytrel®" (e.g. "Hytrel 3548" and "Hytrel 4047")" commercially available from Du Pont-Toray Co., Ltd.; and a thermoplastic styrene elastomer having a trade name of "Rabalon®" commercially available from Mitsubishi Chemical Corporation. In addition, a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester, which are (A) the resin component, may also be used. These resin components may be used solely, or at least two of them may be used in combination.

In the preferable embodiment, the cover composition for forming the cover of the golf ball preferably contains the thermoplastic polyurethane elastomer or the ionomer resin as the resin component. The content of the thermoplastic polyurethane elastomer or the ionomer resin in the resin component of the cover composition is preferably 50 mass % or more, more preferably 60 mass % or more, even more preferably 70 mass % or more.

In addition to the above mentioned resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or a fluorescent brightener, and the like, as long as they do not impair the performance of the cover.

The content of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the content of the white pigment is 0.5 part by mass or more, it is possible to impart the opacity to the cover. In addition, if the content of the white pigment is more than 10 parts by mass, the durability of the resultant cover may deteriorate.

The cover composition preferably has a slab hardness of 70 or less, more preferably 68 or less, even more preferably 65 or less in Shore D hardness. If the slab hardness of the cover composition is 70 or less, the spin rate on approach shots with a short iron or the like becomes greater. As a result, the golf ball having excellent controllability on approach shots may be obtained. In addition, in order to sufficiently ensure the spin rate on approach shots, the cover composition preferably has a slab hardness of 20 or more, more preferably 25 or more, even more preferably 30 or more in Shore D hardness.

Examples of the method for molding the cover of the golf ball according to the present invention include a method which comprises molding the cover composition into a hollow shell, covering the intermediate layer with a plurality of the hollow shells and performing compression molding (preferably a method which comprises molding the cover composition into a hollow half-shell, covering the intermediate layer with two of the half-shells and performing compression molding); and a method which comprises injection molding the cover composition directly onto the intermediate layer.

When molding the cover by the compression molding method, the molding of the half shell may be performed by either a compression molding method or an injection molding method, and the compression molding method is preferred. Compression molding the cover composition into the half shell may be carried out, for example, under a pressure of 1 MPa or more and 20 MPa or less at a temperature of −20° C. or more and +70° C. or less relative to the flow beginning temperature of the cover composition. If the molding is carried out under the above conditions, the half shell having a uniform thickness can be formed. Examples of the method for molding the cover by using the half shell include a method of covering the spherical body having the intermediate layer formed thereon, with two of the half shells, and performing compression molding. Compression molding the half shells into the cover may be carried out, for example, under a pressure of 0.5 MPa or more and 25 MPa or less at a temperature of −20° C. or more and +70° C. or less relative to the flow beginning temperature of the cover composition. If the molding is carried out under the above conditions, the cover having a uniform thickness can be formed.

In the case of injection molding the cover composition into the cover, the cover composition extruded into a pellet form may be subjected to the injection molding, or the dry blended cover materials such as the base resin component, the pigment and the like may be directly subjected to the injection molding. When molding the cover, it is preferred to use upper and lower molds, each having a hemispherical cavity and pimples wherein a part of the pimple also serves as a retractable hold pin. When molding the cover by the injection molding method, the hold pin is protruded to hold the spherical body having the intermediate layer formed thereon, and the cover composition is charged and then cooled to form the cover. For example, the cover may be molded by charging the cover composition heated to 200° C. to 250° C. into a mold held under a pressure of 9 MPa to 15 MPa for 0.5 to 5 seconds, and opening the mold after cooling for 10 to 60 seconds.

The concave portions called "dimple" are usually formed on the surface of the cover. The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The cover preferably has a thickness of 2.0 mm or less, more preferably 1.6 mm or less, even more preferably 1.2 mm or less, particularly preferably 1.0 mm or less. If the thickness of the cover is 2.0 mm or less, the resultant golf ball has better resilience and shot feeling. The cover preferably has a thickness of 0.1 mm or more, more preferably 0.2 mm or more, even more preferably 0.3 mm or more. If the thickness of the cover is less than 0.1 mm, it may become difficult to mold the cover. In addition, the durability and wear resistance of the cover may deteriorate.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but not limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes greater.

FIG. 1 is a partially cutaway view of a golf ball 1 of one embodiment according to the present invention. The golf ball 1 comprises a spherical core 2, an intermediate layer 3 covering the spherical core 2, and a cover 4 covering the intermediate layer 3. A plurality of dimples 41 are formed on the surface of the cover 4. Other portions than the dimples 41 on the surface of the golf ball are land 42. The intermediate layer 3 is formed from the golf ball resin composition mentioned above.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Core Hardness (Shore D Hardness)

The hardness measured at the surface of the core was adopted as the surface hardness of the core. In addition, the hardness measured at the central point of a cut plane which was obtained by cutting the core into two hemispheres was adopted as the center hardness of the core. The hardness was measured with an automatic hardness tester (Digitest II, commercially available from Bareiss company) using a detector of "Shore D".

(2) Slab Hardness (Shore D Hardness)

Sheets with a thickness of about 2 mm were produced by injection molding the resin composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, commercially available from Bareiss company) using a detector of "Shore D".

(3) Compression Deformation Amount (Mm)

The deformation amount of the core or the golf ball along the compression direction (shrinking amount of the core or the golf ball along the compression direction), when applying a load from 98 N as an initial load to 1275 N as a final load to the core or the golf ball, was measured.

(4) Bending Stiffness (Kgf/Cm$^2$)

Test pieces with a thickness of about 2 mm, a width of 20 mm and a length of 100 mm were produced by heat press molding the golf ball resin composition at 190° C. for 10 minutes. The test pieces were stored at a temperature of 23°

C. plus or minus 2° C. and a relative humidity of 50% plus or minus 5% for 14 days. With respect to the obtained test pieces, load scales at predetermined bending angles were measured with Olsen stiffness tester (commercially available from Toyo Seiki Seisaku-sho, Ltd.), the bending angles)(° were plotted in the horizontal axis and the load scale readings were plotted in the vertical axis to obtain a linear approximation curve, and the slope of the linear approximation curve was calculated. Measurement was carried out at a temperature of 23° C. plus or minus 2° C., relative humidity of 50% plus or minus 5%, bending speed of 60°/min, and distance between fulcrums of 50 mm. The bending stiffness was calculated by multiplying the slope value obtained above by 8.7078 and then dividing the obtained product by the cube of thickness (cm) of the test piece. It is noted that, as the bending stiffness within the bending angle from 3° to 12°, the load scales at the bending angles of 3°, 6°, 9° and 12° were measured, and as the bending stiffness within the bending angle from 21° to 30°, the load scales at the bending angles of 21°, 24°, 27° and 30° were measured.

(5) Rebound Resilience (%)

The rebound resilience test was carried out according to JIS K6255 (2013). Sheets with a thickness of about 2 mm were produced by heat press molding the golf ball resin composition at 170° C. for 10 minutes. A cylindrical test piece with a thickness of about 12 mm and a diameter of 28 mm was produced by punching the sheet obtained above into a circular shape with a diameter of 28 mm, and stacking six of the obtained circular sheets. The test piece was stored at a temperature of 23° C. plus or minus 2° C. and a relative humidity of 50% plus or minus 5% for 12 hours. The rebound resilience of the obtained test piece was measured with a Lupke type rebound resilience tester (commercially available from Ueshima Seisakusho Co., Ltd.). The planar part of the stacked test piece obtained above was held by a mechanical fixing method during the measurement, and the measurement was carried out at a temperature of 23° C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

(6) Fluidity

The melt flow rate (MFR) (g/10 min) of the golf ball resin composition was measured with a flow tester (Shimadzu Flow Tester CFT-100C, commercially available from Shimadzu Corporation) according to JIS K7210. The measurement was carried out at a temperature of 190° C. and a load of 2.16 kgf.

(7) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve samples for each golf ball, and the average value thereof was regarded as the coefficient of restitution for the golf ball.

(8) Flight Distance

A W #1 driver provided with a metal head (XXIO S, loft angel: 11°, commercially available from Dunlop Sports Limited) was installed on a swing robot M/C commercially available from Golf Laboratories, Inc. The golf ball was hit at a head speed of 40 m/sec, and the flight distance (the distance from the launch point to the stop point) thereof was measured. It is noted that the measurement was conducted twelve times for each golf ball, and the average value thereof was adopted as the measurement value of the golf ball. In addition, the difference between the flight distance of each golf ball and the flight distance of the golf ball No. 12 (i.e. flight distance difference=flight distance of each golf ball–flight distance of golf ball No. 12) was calculated, and the flight distance was evaluated based on the following standard.

E (excellent): Flight distance difference is at least 3.0 yards.

G (good): Flight distance difference is at least 0 yard and less than 3.0 yards.

P (poor): Flight distance difference is less than 0 yard.

(9) Shot Feeling

An actual hitting test was carried out by ten amateur golfers (high skilled person) using a driver. Feeling at the shot was evaluated by each person based on the following standard. Major result of the evaluations of ten golfers was employed as the shot feeling of the golf ball.

E (excellent): Impact is small and feeling is good.

G (good): Normal feeling.

P (poor): Impact is large and feeling is poor.

[Production of Golf Ball]

(1) Production of Core

The core rubber composition having the formulation shown in Table 1 were kneaded and heat pressed in upper and lower molds, each having a hemispherical cavity, at 170° C. for 20 minutes to obtain spherical cores. It is noted that barium sulfate was appropriately added such that the obtained golf balls have a mass of 45.4 g.

TABLE 1

| Core | | |
|---|---|---|
| Formulation (parts by mass) | Polybutadiene rubber | 100 |
| | Zinc acrylate | 30 |
| | Dicumyl peroxide | 0.5 |
| | 2-Thionaphthol | 0.2 |
| | Barium sulfate | Appropriate amount |
| Properties | Diameter (mm) | 39.1 |
| | Compression deformation amount (mm) | 3.86 |
| | Center hardness (Shore D) | 59.4 |
| | Surface hardness (Shore D) | 76.0 |

Polybutadiene rubber: "BR730 (high cis-bond polybutadiene)" commercially available from JSR Corporation
Zinc acrylate: "ZNDA-90S" commercially available from Nihon Jyoryu Kogyo Co., Ltd.
Dicumyl peroxide: "Percumyl (registered trademark) D" commercially available from NOF Corporation
2-Thionaphthol: commercially available from Tokyo Chemical Industry Co., Ltd.
Barium sulfate: "Barium Sulfate BD" commercially available from Sakai Chemical Industry Co., Ltd.

(2) Preparation of Resin Composition (Golf Balls No. 1 to 26)

According to the formulations shown in Tables 2 to 5, the component (A), component (B), component (C) and component (D) were charged into a kneader and kneaded at 220° C. for 20 minutes to prepare golf ball resin compositions. The obtained golf ball resin compositions were pelletized with an extruder.

(3) Preparation of Resin Composition (Golf Balls No. 27 to 34)

According to the formulations shown in Table 6, the component (A), component (B), component (C) and component (D) were charged into a kneader and kneaded at 220° C. for 20 minutes, and then the component (E) was charged therein and further kneaded for 10 minutes to prepare golf ball resin compositions. The obtained golf ball resin compositions were pelletized with an extruder. It is noted that the material temperature when the component (E) was charged and the kneading temperature after the component (E) was charged were set to 200° C. when PCF7670 or Esuben NO 12 was used, and were set to 180° C. when Rap dGO was used.

TABLE 2

| | | | | Golf ball No. | | | | | | |
|---|---|---|---|---|---|---|---|---|---|---|
| | | | | 1 | 2 | 3 | 4 | 5 | 6 | 7 |
| Golf ball resin composition | Formulation (parts by mass) | (A) | Binary copolymer 1 | 100 | — | — | — | — | — | — |
| | | | Binary copolymer 2 | — | 100 | — | — | — | 100 | — |
| | | | Ternary copolymer 1 | — | — | — | 100 | — | — | — |
| | | | Binary copolymer 3 | — | — | 100 | — | 100 | — | 100 |
| | | | Binary copolymer 4 | — | — | — | — | — | — | — |
| | | (B) | Behenic acid | 30 | 30 | 60 | 30 | 30 | 30 | 60 |
| | | | Stearic acid | — | — | — | — | — | — | — |
| | | | Oleic acid | 100 | 100 | 40 | 100 | 100 | 100 | 40 |
| | | | Linoleic acid | — | — | — | — | — | — | — |
| | | (D) | Oleylbetaine | 5 | 5 | — | 5 | 5 | 5 | — |
| | | (C) | Magnesium hydroxide | 21.5 | 23.9 | 14.8 | 18.8 | 19.2 | — | — |
| | | | Sodium hydroxide | — | — | — | — | — | 32.8 | 20.3 |
| | Properties | | (b-1)/(b-2) | 0.3 | 0.3 | 1.5 | 0.3 | 0.3 | 0.3 | 1.5 |
| | | | Neutralization degree (%) | 120 | 120 | 120 | 120 | 120 | 120 | 120 |
| | | | Slab hardness (Shore D) | 55 | 59 | 54 | 54 | 52 | 55 | 55 |
| | | Bending stiffness | $M_{3-12}$ (kgf/cm$^2$) | 1214 | 1245 | 1837 | 1184 | 1153 | 1276 | 1980 |
| | | | $M_{21-30}$ (kgf/cm$^2$) | 803 | 1026 | 1561 | 1113 | 1061 | 1224 | 1801 |
| | | | $M_{3-12}/M_{21-30}$ | 1.51 | 1.21 | 1.18 | 1.06 | 1.09 | 1.04 | 1.10 |
| | | | Rebound resilience R (%) | 74 | 73 | 63 | 73 | 74 | 71 | 62 |
| | | | Resilience index value $((M_{21-30})^{0.5} \times (R/100)^3)$ | 11.5 | 12.5 | 9.9 | 13.0 | 13.2 | 12.5 | 10.1 |
| | | | Melt flow rate (g/10 min) | 3.9 | 1.9 | 3.0 | 4.2 | 4.2 | 1.1 | 2.3 |
| | | | Thickness of intermediate layer (mm) | 1.0 | 1.0 | 1.0 | 1.0 | 1.0 | 1.0 | 1.0 |
| | Golf ball properties | | Compression deformation amount (mm) | 3.25 | 3.03 | 3.31 | 3.31 | 3.43 | 3.25 | 3.25 |
| | | | Coefficient of restitution | 0.780 | 0.778 | 0.764 | 0.777 | 0.779 | 0.774 | 0.763 |
| | | | Flight distance | E | E | E | E | E | E | E |
| | | | Shot feeling | E | E | E | E | E | E | E |

TABLE 3

| | | | | Golf ball No. | | | | | | |
|---|---|---|---|---|---|---|---|---|---|---|
| | | | | 8 | 9 | 10 | 11 | 12 | 13 | 14 |
| Golf ball resin composition | Formulation (parts by mass) | (A) | Binary copolymer 1 | 100 | 100 | 100 | 100 | 100 | 100 | 100 |
| | | | Binary copolymer 2 | — | — | — | — | — | — | — |
| | | | Ternary copolymer 1 | — | — | — | — | — | — | — |
| | | | Binary copolymer 3 | — | — | — | — | — | — | — |
| | | | Binary copolymer 4 | — | — | — | — | — | — | — |
| | | (B) | Behenic acid | 30 | 30 | 30 | 30 | — | 90 | — |
| | | | Stearic acid | — | — | — | — | — | — | — |
| | | | Oleic acid | 100 | 100 | 100 | 100 | — | — | 90 |
| | | | Linoleic acid | — | — | — | — | — | — | — |
| | | (D) | Oleylbetaine | 5 | 5 | 5 | 5 | — | — | 5 |
| | | (C) | Magnesium hydroxide | 16.1 | 18.0 | 22.6 | 27.2 | 6.1 | 15.3 | 17.3 |
| | | | Sodium hydroxide | — | — | — | — | — | — | — |
| | Properties | | (b-1)/(b-2) | 0.3 | 0.3 | 0.3 | 0.3 | — | — | — |
| | | | Neutralization degree (%) | 90 | 100 | 125 | 150 | 120 | 120 | 120 |
| | | | Slab hardness (Shore D) | 55 | 55 | 55 | 59 | 54 | 50 | 54 |
| | | Bending stiffness | $M_{3-12}$ (kgf/cm$^2$) | 1122 | 1214 | 1265 | 1378 | 429 | 378 | 745 |
| | | | $M_{21-30}$ (kgf/cm$^2$) | 1044 | 1141 | 1177 | 1267 | 408 | 337 | 648 |
| | | | $M_{3-12}/M_{21-30}$ | 1.08 | 1.06 | 1.08 | 1.09 | 1.05 | 1.12 | 1.15 |
| | | | Rebound resilience R (%) | 69 | 73 | 73 | 71 | 65 | 68 | 69 |
| | | | Resilience index value $((M_{21-30})^{0.5} \times (R/100)^3)$ | 10.6 | 13.1 | 13.3 | 12.7 | 5.5 | 5.8 | 8.4 |
| | | | Melt flow rate (g/10 min) | 7.3 | 4.1 | 3.4 | 2.7 | failed to be measured | 3.3 | 3.7 |
| | | | Thickness of intermediate layer (mm) | 1.0 | 1.0 | 1.0 | 1.0 | 1.0 | 1.0 | 1.0 |
| | Golf ball properties | | Compression deformation amount (mm) | 3.25 | 3.25 | 3.25 | 3.03 | 3.31 | 3.57 | 3.31 |
| | | | Coefficient of restitution | 0.764 | 0.777 | 0.778 | 0.765 | 0.738 | 0.740 | 0.755 |
| | | | Flight distance | E | E | E | E | G | G | G |
| | | | Shot feeling | E | E | E | E | E | E | E |

TABLE 4

| | | | | Golf ball No. | | | | | | |
|---|---|---|---|---|---|---|---|---|---|---|
| | | | | 15 | 16 | 17 | 18 | 19 | 20 | 21 |
| Golf ball resin composition | Formulation (parts by mass) | (A) | Binary copolymer 1 | — | — | — | — | 100 | 100 | 100 |
| | | | Binary copolymer 2 | 100 | — | — | — | — | — | — |
| | | | Ternary copolymer 1 | — | 100 | 100 | 100 | — | — | — |
| | | | Binary copolymer 3 | — | — | — | — | — | — | — |
| | | | Binary copolymer 4 | — | — | — | — | — | — | — |
| | | (B) | Behenic acid | 30 | 100 | 30 | 130 | — | 50 | — |
| | | | Stearic acid | — | — | — | — | — | 50 | — |
| | | | Oleic acid | — | — | — | — | 130 | — | 50 |
| | | | Linoleic acid | — | — | — | — | — | — | 50 |
| | | (D) | Oleylbetaine | 30 | — | — | — | 5 | — | — |
| | | (C) | Magnesium hydroxide | 11.7 | 13.9 | 6.3 | 17.0 | 22.3 | 17.3 | 18.6 |
| | | | Sodium hydroxide | — | — | — | — | — | — | — |
| | Properties | | (b-1)/(b-2) | — | — | — | — | — | 1.0 | 1.0 |
| | | | Neutralization degree (%) | 120 | 120 | 120 | 120 | 120 | 120 | 120 |
| | | | Slab hardness (Shore D) | 55 | 59 | 57 | 60 | 50 | 60 | 51 |
| | | Bending stiffness | $M_{3\text{-}12}$ (kgf/cm$^2$) | 1031 | 2571 | 1684 | 2827 | 1122 | 1745 | 490 |
| | | | $M_{21\text{-}30}$ (kgf/cm$^2$) | 939 | 1571 | 1599 | 2000 | 1066 | 1367 | 465 |
| | | | $M_{3\text{-}12}/M_{21\text{-}30}$ | 1.10 | 1.64 | 1.05 | 1.41 | 1.05 | 1.28 | 1.05 |
| | | | Rebound resilience R (%) | 65 | 57 | 57 | 55 | 56 | 59 | 68 |
| | | | Resilience index value $((M_{21\text{-}30})^{0.5} \times (R/100)^3)$ | 8.4 | 7.3 | 7.4 | 7.4 | 5.7 | 7.6 | 6.8 |
| | | | Melt flow rate (g/10 min) | 0.2 | 2.5 | 1.0 | 3.6 | 4.0 | 2.1 | 3.4 |
| | | | Thickness of intermediate layer (mm) | 1.0 | 1.0 | 1.0 | 1.0 | 1.0 | 1.0 | 1.0 |
| Golf ball properties | | | Compression deformation amount (mm) | 3.25 | 3.03 | 3.12 | 2.96 | 3.57 | 2.98 | 3.50 |
| | | | Coefficient of restitution | 0.754 | 0.757 | 0.749 | 0.754 | 0.739 | 0.753 | 0.745 |
| | | | Flight distance | G | G | G | G | G | G | G |
| | | | Shot feeling | E | E | E | P | E | P | E |

TABLE 5

| | | | | Golf ball No. | | | | |
|---|---|---|---|---|---|---|---|---|
| | | | | 22 | 23 | 24 | 25 | 26 |
| Golf ball resin composition | Formulation (parts by mass) | (A) | Binary copolymer 1 | 100 | — | — | 100 | 100 |
| | | | Binary copolymer 2 | — | 100 | — | — | — |
| | | | Ternary copolymer 1 | — | — | — | — | — |
| | | | Binary copolymer 3 | — | — | 100 | — | — |
| | | | Binary copolymer 4 | — | — | — | — | — |
| | | (B) | Behenic acid | 30 | 30 | 60 | 30 | 30 |
| | | | Stearic acid | — | — | — | — | — |
| | | | Oleic acid | 100 | 100 | 40 | 30 | 30 |
| | | | Linoleic acid | — | — | — | — | — |
| | | (D) | Oleylbetaine | 5 | 5 | — | 5 | — |
| | | (C) | Magnesium hydroxide | 14.3 | 15.7 | 7.4 | 13.0 | 12.9 |
| | | | Sodium hydroxide | — | — | — | — | — |
| | Properties | | (b-1)/(b-2) | 0.3 | 0.3 | 1.5 | 1.0 | 1.0 |
| | | | Neutralization degree (%) | 80 | 80 | 60 | 120 | 120 |
| | | | Slab hardness (Shore D) | 54 | 56 | 51 | 54 | 51 |
| | | Bending stiffness | $M_{3\text{-}12}$ (kgf/cm$^2$) | 1000 | 1051 | 1071 | 816 | 1204 |
| | | | $M_{21\text{-}30}$ (kgf/cm$^2$) | 950 | 998 | 959 | 776 | 1144 |
| | | | $M_{3\text{-}12}/M_{21\text{-}30}$ | 1.05 | 1.05 | 1.12 | 1.05 | 1.05 |
| | | | Rebound resilience R (%) | 64 | 63 | 55 | 65 | 58 |
| | | | Resilience index value $((M_{21\text{-}30})^{0.5} \times (R/100)^3)$ | 8.1 | 7.9 | 5.2 | 7.6 | 6.6 |
| | | | Melt flow rate (g/10 min) | 15.0 | 13.0 | 20.0 | 2.5 | 2.7 |
| | | | Thickness of intermediate layer (mm) | 1.0 | 1.0 | 1.0 | 1.0 | 1.0 |
| Golf ball properties | | | Compression deformation amount (mm) | 3.31 | 3.19 | 3.50 | 3.31 | 3.50 |
| | | | Coefficient of restitution | 0.752 | 0.751 | 0.737 | 0.749 | 0.744 |
| | | | Flight distance | G | G | P | G | G |
| | | | Shot feeling | E | E | E | E | E |

TABLE 6

| | | | | Golf ball No. | | | | | | | |
|---|---|---|---|---|---|---|---|---|---|---|---|
| | | | | 27 | 28 | 29 | 30 | 31 | 32 | 33 | 34 |
| Golf ball resin composition | Formulation (parts by mass) | (A) | Binary copolymer 1 | 100 | 100 | 100 | 100 | 100 | — | — | — |
| | | | Binary copolymer 2 | — | — | — | — | — | — | — | — |
| | | | Ternary copolymer 1 | — | — | — | — | — | — | — | — |
| | | | Binary copolymer 3 | — | — | — | — | — | 100 | — | 100 |
| | | | Binary copolymer 4 | — | — | — | — | — | — | 100 | — |
| | | (B) | Oleic acid | 90 | 90 | 90 | 90 | 90 | 130 | 90 | 90 |
| | | | Linoleic acid | — | — | — | — | — | — | — | — |
| | | (D) | Oleylbetaine | 5 | 5 | 5 | 5 | 5 | 5 | 30 | 30 |
| | | (E) | PCF7620A | 5 | 10 | — | — | — | — | — | — |
| | | | Rap dGO | — | — | 5 | 10 | 20 | — | — | — |
| | | | Esuben NO12 | — | — | — | — | — | 20 | 35 | 45 |
| | | (C) | Magnesium hydroxide | 17.3 | 17.3 | 17.3 | 17.3 | 17.3 | 19.8 | 16.1 | 15.3 |
| | | | Sodium hydroxide | — | — | — | — | — | — | — | — |
| | Properties | | Neutralization degree (%) | 120 | 120 | 120 | 120 | 120 | 120 | 120 | 120 |
| | | | Slab hardness (Shore D) | 59 | 59 | 57 | 58 | 59 | 54 | 55 | 54 |
| | | Bending stiffness | $M_{3-12}$ (kgf/cm$^2$) | 1414 | 1798 | 1115 | 1162 | 1588 | 2836 | 3574 | 3057 |
| | | | $M_{21-30}$ (kgf/cm$^2$) | 1307 | 1387 | 868 | 888 | 1166 | 878 | 892 | 701 |
| | | | $M_{3-12}/M_{21-30}$ | 1.08 | 1.30 | 1.28 | 1.31 | 1.36 | 3.23 | 4.00 | 4.36 |
| | | | Rebound resilience R (%) | 72 | 70 | 71 | 72 | 72 | 55 | 54 | 49 |
| | | | Resilience index value $((M_{21-30})^{0.5} \times (R/100)^3)$ | 13.5 | 12.8 | 10.5 | 11.1 | 12.7 | 4.9 | 4.7 | 3.1 |
| | | | Melt flow rate (g/10 min) | 3.4 | 3.2 | 3.5 | 3.3 | 3.1 | 5.5 | 1.5 | 2.4 |
| | | | Thickness of intermediate layer (mm) | 1.0 | 1.0 | 1.0 | 1.0 | 1.0 | 1.0 | 1.0 | 1.0 |
| Golf ball properties | | | Compression deformation amount (mm) | 3.01 | 2.97 | 3.12 | 3.04 | 2.99 | 3.22 | 3.30 | 3.15 |
| | | | Coefficient of restitution | 0.772 | 0.763 | 0.771 | 0.772 | 0.773 | 0.735 | 0.727 | 0.728 |
| | | | Flight distance | E | E | E | E | E | P | P | P |
| | | | Shot feeling | E | E | E | E | E | G | G | G |

The following materials are used in Tables 2 to 6.
Binary copolymer 1: ethylene-methacrylic acid copolymer (content of methacrylic acid: 15 mass %, MFR (190° C., 2.16 kgf): 60 g/10 min, bending stiffness: 81 MPa)
Binary copolymer 2: ethylene-methacrylic acid copolymer (content of methacrylic acid: 20 mass %, MFR (190° C., 2.16 kgf): 60 g/10 min)
Ternary copolymer 1: ethylene/methacrylic acid copolymer (content of methacrylic acid: 8 mass %)
Binary copolymer 3: ethylene-methacrylic acid copolymer (content of methacrylic acid: 9 mass %, MFR (190° C., 2.16 kgf): 8 g/10 min)
Binary copolymer 4: ethylene-methacrylic acid copolymer (content of methacrylic acid: 11 mass %, MFR (190° C., 2.16 kgf): 8 g/10 min)
Behenic acid: commercially available from Tokyo Chemical Industry Co., Ltd.
Stearic acid: commercially available from Tokyo Chemical Industry Co., Ltd.
Oleic acid: commercially available from Tokyo Chemical Industry Co., Ltd.
Linoleic acid: commercially available from Tokyo Chemical Industry Co., Ltd.
Oleylbetaine: purified product obtained by removing water and salt from "Chembetaine OL" commercially available from The Lubrizol Corporation Magnesium hydroxide: commercially available from Wako Pure Chemical Industries, Ltd.
Sodium hydroxide: commercially available from Wako Pure Chemical Industries, Ltd.
PCF7620A: aluminum powder having a polymer coated on the surface (average diameter in the transverse direction: 0.3 μm, average diameter in the longitudinal direction: 18 μm, average aspect ratio: 60, coating agent: polymer composed of (meth)acrylic acid and/or (meth)acrylic acid derivate, content of surface functional group: ranging from 40 μg/g to 150 μg/g), commercially available from Toyo Aluminium K.K.
Rap dGO: graphene oxide (carbonaceous filler having a polar functional group directly bonding to a carbon filler, average short diameter: 2 μm, average long diameter: 20 μm, average aspect ratio: 10, average thickness: 5 nm, type of functional group: carboxyl group and hydroxyl group, amount of functional group: 1.2 mmol/g), commercially available from Nishina Material Company Esuben NO12: organically treated montmorillonite commercially available from Hojun Co., Ltd.

(4) Production of Intermediate Layer
Golf Balls No. 1 to 11, 13, 14 and 16 to 34
The intermediate layer (thickness: 1 mm) covering the core was formed by injection molding the resin composition on the spherical core. The resin composition was heated to 200° C. to 260° C. at the cylinder part of the injection unit, injected into a mold held under a pressure of 15 MPa, and cooled for 30 seconds. The spherical body having the intermediate layer formed thereon was ejected from the mold. It is noted that the intermediate layers of the golf balls No. 12 and 15 failed to be produced by injection molding since the resin compositions had a low fluidity.
Golf Balls No. 12 and 15
The resin composition in a pellet form was charged into each concave portion of the lower mold of the molds for molding half shells, and compressed to form half shells. The spherical core was concentrically covered with two of the obtained half shells, and compression molded to form the intermediate layer with a thickness of 1.0 mm. The compression molding was carried out at 170° C. for 15 minutes.

(5) Production of Cover

Cover compositions in a pellet form were prepared by mixing the materials having the formulation shown in Table 7 with a twin-screw kneading extruder. Extrusion of the cover composition was carried out under the conditions of screw diameter: 45 mm, screw revolutions: 200 rpm and screw L/D=35. The blended materials were heated to 160° C. to 230° C. at the die position of the extruder. The surface of the obtained golf ball bodies was treated with sandblast, marked, and painted with a clear paint. The paint was dried in an oven at 40° C. to obtain golf balls with a diameter of 42.7 mm and a mass of 45.4 g.

TABLE 7

| Cover composition | | |
|---|---|---|
| Formulation | Elastollan | 100 |
| (parts by mass) | Titanium oxide | 4 |
| Slab hardness (Shore D) | | 57 |

Elastollan (registered trademark): thermoplastic polyurethane elastomer commercially available from BASF Japan Ltd.
Titanium oxide: A220 commercially available from Ishihara Sangyo Kaisha, Ltd.

The evaluation results of the obtained golf balls are shown in Tables 2 to 6. In addition, FIG. 2 shows a relationship between the resilience index value and the coefficient of restitution of each golf ball, and FIG. 3 shows a relationship between $(M_{21-30})^{0.5}$ and $(R/100)^3$.

Figure 2:
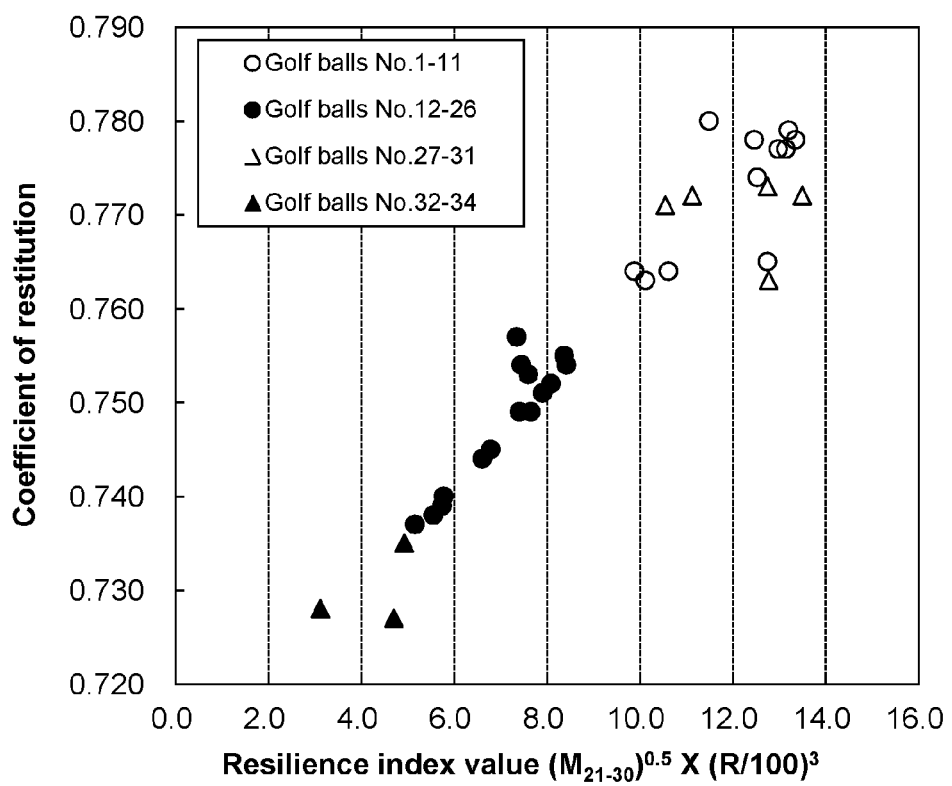
FIG. 2 is a graph showing a relationship between a resilience index value ($(M_{21-30})^{0.5} \times (R/100)^3$) and a coefficient of restitution of a golf ball.
Figure 3:
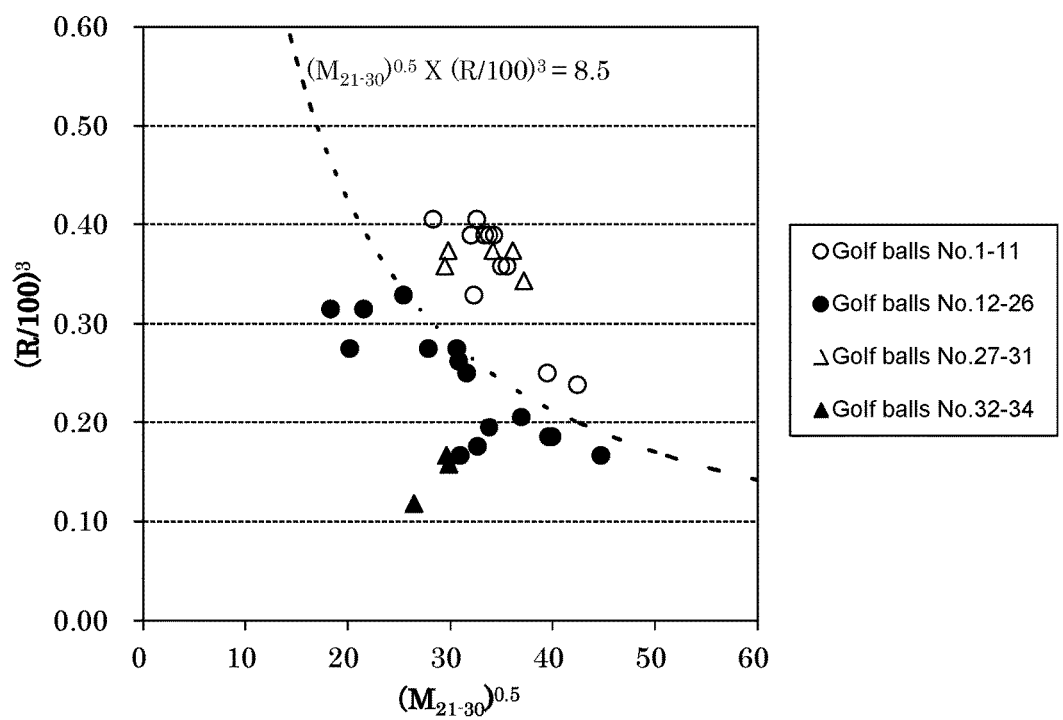
FIG. 3 is graph showing a relationship between $(M_{21-30})^{0.5}$ and $(R/100)^3$.

It is apparent from FIG. 2 that the resilience index value $((M_{21-30})^{0.5} \times (R/100)^3)$ positively correlates to the resilience performance of the golf ball. The golf balls No. 1 to 11 and 27 to 31 are the golf balls comprising an intermediate layer formed from the golf ball resin composition, wherein the golf ball resin composition has a bending stiffness ($M_{21-30}$) ranging from 600 kgf/cm² to 5,000 kgf/cm², a rebound resilience (R) of 50% or more, a slab hardness (Shore D) ranging from 40 to 65, a MFR of 1.0 g/10 min or more, and a resilience index value of 8.5 or more. The intermediate layers of these golf balls can be produced by the injection molding method, and thus the productivity is high. In addition, each of these golf balls No. 1 to 11 and 27 to 31 has excellent flight performance and shot feeling.

The golf ball resin composition according to the present invention is preferably used for a constituent member of a golf ball, and is particularly useful for an intermediate layer of a golf ball.

This application is based on Japanese patent application No. 2015-118815 filed on Jun. 12, 2015, the contents of which are hereby incorporated by reference.

The invention claimed is:

1. A golf ball resin composition having
   a bending stiffness ($M_{21-30}$) ranging from 600 kgf/cm² to 5,000 kgf/cm² within a bending angle from 21° to 30°,
   a bending stiffness ($M_{3-12}$) ranging from 500 kgf/cm² to 10,000 kgf/cm² within a bending angle from 3° to 12°,
   a ratio ($M_{3-12}/M_{21-30}$) of the bending stiffness ($M_{3-12}$) to the bending stiffness ($M_{21-30}$) that ranges from 0.80 to 2.00,
   a rebound resilience (R) of 50% or more,
   a slab hardness (Shore D) ranging from 40 to 65 and
   a melt flow rate (190° C., 2.16 kgf) of 1.0 g/10 min or more,
   wherein these properties satisfy the following relationship: $(M_{21-30})^{0.5} \times (R/100)^3 \geq 8.5$; and
   wherein the golf ball resin composition comprises as (A) a resin component, at least one selected from the group consisting of:
   (a-1) a binary copolymer composed of an olefin and an α,β-unsaturated carboxylic acid having 3 to 8 carbon atoms,
   (a-2) an ionomer resin consisting of a metal ion-neutralized product of a binary copolymer composed of an olefin and an α,β-unsaturated carboxylic acid having 3 to 8 carbon atoms,
   (a-3) a ternary copolymer composed of an olefin, an α,β-unsaturated carboxylic acid having 3 to 8 carbon atoms and an α,β-unsaturated carboxylic acid ester, and
   (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
   (B) a fatty acid and/or a fatty acid metal salt in an amount ranging from 80 parts by mass to 200 parts by mass with respect to 100 parts by mass of the component (A).

2. The golf ball resin composition according to claim 1, wherein the golf ball resin composition has a neutralization degree of more than 80 mole %.

3. The golf ball resin composition according to claim 1, wherein the component (B) contains (b-1) a saturated fatty acid and/or a metal salt thereof and (b-2) an unsaturated fatty acid and/or a metal salt thereof.

4. The golf ball resin composition according to claim 3, wherein (b-1) the saturated fatty acid and/or the metal salt thereof includes at least one selected from the group consisting of palmitic acid, stearic acid, arachidic acid, behenic acid, lignoceric acid, montanic acid and metal salts thereof, and (b-2) the unsaturated fatty acid and/or the metal salt thereof includes at least one selected from the group consisting of palmitoleic acid, oleic acid, linoleic acid, arachidonic acid and metal salts thereof.

5. The golf ball resin composition according to claim 3, wherein a mass ratio ((b-1)/(b-2)) of (b-1) the saturated fatty acid and/or the metal salt thereof to (b-2) the unsaturated fatty acid and/or the metal salt thereof ranges from 0.25 to 2.3.

6. The golf ball resin composition according to claim 1, wherein the golf ball resin composition further comprises (D) an amphoteric surfactant.

7. The golf ball resin composition according to claim 6, wherein (D) the amphoteric surfactant includes at least one selected from the group consisting of a betaine type amphoteric surfactant, an amidoamino acid type amphoteric surfactant, an alkylamino fatty acid salt type amphoteric surfactant, an alkylamine oxide type amphoteric surfactant, a β-alanine type amphoteric surfactant, a glycine type amphoteric surfactant, a sulfobetaine type amphoteric surfactant and a phosphobetaine type amphoteric surfactant.

8. The golf ball resin composition according to claim 1, wherein the golf ball resin composition further comprises (E) a filler.

9. The golf ball resin composition according to claim 8, wherein (E) the filler is (e-1) a metal filler having a surface coated with a polymer, a material for forming the metal filler includes at least one selected from the group consisting of aluminum, titanium, zinc, chromium, iron, nickel, tin and copper, and the polymer includes at least one selected from the group consisting of (meth)acrylic acid, methyl (meth) acrylate, ethyl (meth)acrylate, n-propyl (meth)acrylate, i-propyl (meth)acrylate, 1-methylpropyl (meth)acrylate, 2-methylpropyl (meth)acrylate, n-butyl (meth)acrylate, t-butyl (meth)acrylate, (meth)acrylic acid chloride, (meth)acrylic acid bromide and (meth)acrylic acid imidazole.

10. The golf ball resin composition according to claim 9, wherein (e-1) the metal filler having a surface coated with the polymer has an average diameter ranging from 0.1 μm to 200 μm in a transverse direction, an average diameter ranging from 0.5 μm to 300 μm in a longitudinal direction, and an average aspect ratio ranging from 1.5 to 3000.

11. The golf ball resin composition according to claim 8, wherein (E) the filler is (e-2) a carbonaceous filler having a polar functional group on a surface thereof, and the polar functional group includes at least one selected from the group consisting of a carboxyl group, a hydroxyl group, an amino group, a thiol group, a sulfo group and a phosphonic acid group.

12. The golf ball resin composition according to claim 11, wherein (e-2) the carbonaceous filler having the polar functional group on the surface thereof has an average diameter ranging from 0.1 μm to 100 μm in a transverse direction, an average diameter ranging from 0.2 μm to 300 μm in a longitudinal direction, an aspect ratio ranging from 2.0 to 1000, and a thickness ranging from 0.3 nm to 50 nm.

13. The golf ball resin composition according to claim 1, wherein the golf ball resin composition further comprises (C) a metal compound.

14. The golf ball resin composition according to claim 1, wherein (A) the resin component contains
(a-2) the ionomer resin consisting of a metal ion-neutralized product of a binary copolymer composed of an olefin and an α,β-unsaturated carboxylic acid having 3 to 8 carbon atoms and/or
(a-4) the ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
(a-2) the ionomer resin and/or (a-4) the ionomer resin includes magnesium, zinc or sodium as a metal ion for neutralizing the carboxyl groups thereof.

15. The golf ball resin composition according to claim 1, wherein (B) the fatty acid and/or the fatty acid metal salt contains a metal salt of a fatty acid, and a metal component constituting the metal salt of the fatty acid includes magnesium, calcium or barium.

16. The golf ball resin composition according to claim 1, wherein the golf ball resin composition comprises (B) the fatty acid and/or the fatty acid metal salt in an amount of higher than 100 parts by mass and 200 parts by mass or less with respect to 100 parts by mass of the component (A).

17. A golf ball comprising a spherical core, at least one intermediate layer covering the spherical core, and a cover covering the intermediate layer, wherein at least one of the intermediate layers is formed from a golf ball resin composition, and wherein the golf ball resin composition has
a bending stiffness ($M_{21-30}$) ranging from 600 kgf/cm$^2$ to 5,000 kgf/cm$^2$ within a bending angle from 21° to 30°,
a bending stiffness ($M_{3-12}$) ranging from 500 kgf/cm$^2$ to 10,000 kgf/cm$^2$ within a bending angle from 3° to 12°,
a ratio ($M_{3-12}/M_{21-30}$) of the bending stiffness ($M_{3-12}$) to the bending stiffness ($M_{21-30}$) ranging from 0.80 to 2.00,
a rebound resilience (R) of 50% or more,
a slab hardness (Shore D) ranging from 40 to 65 and
a melt flow rate (190° C., 2.16 kgf) of 1.0 g/10 min or more,
wherein these properties satisfy the following relationship $(M_{21-30})^{0.5} \times (R/100)^3 \geq 8.5$; and
wherein the golf ball resin composition comprises:
as (A) a resin component, at least one selected from the group consisting of:
(a-1) a binary copolymer composed of an olefin and an α,β-unsaturated carboxylic acid having 3 to 8 carbon atoms,
(a-2) an ionomer resin consisting of a metal ion-neutralized product of a binary copolymer composed of an olefin and an α,β-unsaturated carboxylic acid having 3 to 8 carbon atoms,
(a-3) a ternary copolymer composed of an olefin, an α,β-unsaturated carboxylic acid having 3 to 8 carbon atoms and an α,β-unsaturated carboxylic acid ester, and
(a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
(B) a fatty acid and/or a fatty acid metal salt in an amount ranging from 80 parts by mass to 200 parts by mass with respect to 100 parts by mass of the component (A).

18. The golf ball according to claim 17, wherein the intermediate layer has a thickness of 0.5 mm or more and less than 2.5 mm.

19. The golf ball according to claim 17, wherein the component (B) contains (b-1) a saturated fatty acid and/or a metal salt thereof and (b-2) an unsaturated fatty acid and/or a metal salt thereof.

20. A golf ball resin composition having
a bending stiffness ($M_{21-30}$) ranging from 600 kgf/cm$^2$ to 5,000 kgf/cm$^2$ within a bending angle from 21° to 30°,
a rebound resilience (R) of 50% or more, a slab hardness (Shore D) ranging from 40 to 65, and
a melt flow rate (190° C., 2.16 kgf) of 1.0 g/10 min or more,
wherein these properties satisfy the relationship $(M_{21-30})^{0.5} \times (R/100)^3 \geq 8.5$; and
wherein the golf ball resin composition comprises as (A) a resin component, at least one selected from the group consisting of:
(a-1) a binary copolymer composed of an olefin and an α,β-unsaturated carboxylic acid having 3 to 8 carbon atoms,
(a-2) an ionomer resin consisting of a metal ion-neutralized product of a binary copolymer composed of an olefin and an α,β-unsaturated carboxylic acid having 3 to 8 carbon atoms,
(a-3) a ternary copolymer composed of an olefin, an α,β-unsaturated carboxylic acid having 3 to 8 carbon atoms and an α,β-unsaturated carboxylic acid ester, and
(a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and
further comprises (E) a filler selected from the group consisting of
(e-1) a metal filler having a surface coated with a polymer wherein a material for forming the metal filler includes at least one selected from the group consisting of aluminum, titanium, zinc, chromium, iron, nickel, tin and copper, and the polymer includes at least one selected from the group consisting of (meth)acrylic acid, methyl (meth)acrylate, ethyl (meth)acrylate, n-propyl (meth)acrylate, i-propyl (meth)acrylate, 1-methylpropyl (meth)acrylate, 2-methylpropyl (meth)

acrylate, n-butyl (meth)acrylate, t-butyl (meth)acrylate, (meth)acrylic acid chloride, (meth)acrylic acid bromide and (meth)acrylic acid imidazole; and (e-2) a carbonaceous filler having a polar functional group on a surface thereof wherein the polar functional group includes at least one selected from the group consisting of a carboxyl group, a hydroxyl group, an amino group, a thiol group, a sulfo group and a phosphonic acid group.

21. A golf ball resin composition having:

a bending stiffness ($M_{21-30}$) ranging from 600 kgf/cm² to 5,000 kgf/cm² within a bending angle from 21° to 30°, a rebound resilience (R) of 50% or more, a slab hardness (Shore D) ranging from 40 to 65 and a melt flow rate (190° C., 2.16 kgf) of 1.0 g/10 min or more, wherein these properties satisfy the following relationship: $(M_{21-30})^{0.5} \times R/100)^3 \geq 8.5$;

and wherein the golf ball resin composition comprises:
as (A) a resin component, at least one selected from the group consisting of:
- (a-1) a binary copolymer composed of an olefin and an α,β-unsaturated carboxylic acid having 3 to 8 carbon atoms,
- (a-2) an ionomer resin consisting of a metal ion-neutralized product of a binary copolymer composed of an olefin and an α,β-unsaturated carboxylic acid having 3 to 8 carbon atoms,
- (a-3) a ternary copolymer composed of an olefin, an 4-unsaturated carboxylic acid having 3 to 8 carbon atoms and an α,β-unsaturated carboxylic acid ester, and
- (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and (D) an amphoteric surfactant.

* * * * *